United States Patent
Suzuki et al.

(10) Patent No.: US 10,115,132 B2
(45) Date of Patent: Oct. 30, 2018

(54) DISTRIBUTION APPARATUS, A TERMINAL APPARATUS, AND A DISTRIBUTION METHOD FOR CONTROLLING TRANSPARENCY OF MULTIPLE CONTENTS DISPLAYED ON A DISPLAY IN RESPONSE TO AN INPUT OPERATION

(71) Applicant: YAHOO JAPAN CORPORATION, Tokyo (JP)

(72) Inventors: Tatsuaki Suzuki, Tokyo (JP); Daisuke Kobayashi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 710 days.

(21) Appl. No.: 14/325,838

(22) Filed: Jul. 8, 2014

(65) Prior Publication Data

US 2015/0088667 A1 Mar. 26, 2015

(30) Foreign Application Priority Data

Sep. 20, 2013 (JP) ................................ 2013-195845

(51) Int. Cl.
*G06Q 30/00* (2012.01)
*G06Q 30/02* (2012.01)
(Continued)

(52) U.S. Cl.
CPC ....... *G06Q 30/0277* (2013.01); *G06F 3/0425* (2013.01); *G06F 3/0485* (2013.01);
(Continued)

(58) Field of Classification Search
CPC . G06Q 30/0277; G06Q 30/0269; G06Q 30/02
See application file for complete search history.

(56) References Cited

U.S. PATENT DOCUMENTS

| 4,954,818 | A | * | 9/1990 | Nakane | .................... | G09G 5/14 345/536 |
| 5,440,680 | A | * | 8/1995 | Ichikawa | ................. | G09G 5/14 345/536 |

(Continued)

FOREIGN PATENT DOCUMENTS

| JP | A-2003-22042 | 1/2003 |
| JP | A-2006-98888 | 4/2006 |

(Continued)

OTHER PUBLICATIONS

Ryutaro Yaguchi, "Case Study, Scene of Problem Solving, Hard Fight in First Development of Android, Preoccupied with Dealing with Machine Dependence", Nikkei Systems, Nikkei Business Publications, Inc., Jan. 26, 2012, No. 226, pp. 66-69.

(Continued)

*Primary Examiner* — Luis A Brown
*Assistant Examiner* — Radu Andrei
(74) *Attorney, Agent, or Firm* — Oliff PLC

(57) ABSTRACT

A distribution apparatus includes a memory and a processor programmed to distribute control information and a first content to a terminal apparatus. The control information causes the terminal apparatus to execute displaying the first content superimposed onto a second content in a first display mode, the second content having a higher transparency than the first content; detecting an input operation causing the first content to move relative to the display region; in response to the detected input operation and the first content moving, changing the first display mode to a second display mode by changing a transparency of at least one of the first content and the second content, such that the first content and the second content are visible in the display region; and in response to completion of the input operation and the first (Continued)

content not moving, changing the second display mode to the first display mode.

20 Claims, 15 Drawing Sheets

(51) Int. Cl.
    *H04N 21/8358*     (2011.01)
    *G06T 1/00*     (2006.01)
    *G06F 3/042*     (2006.01)
    *G06T 3/00*     (2006.01)
    *H04N 21/414*     (2011.01)
    *G06F 3/0488*     (2013.01)
    *G06F 3/0485*     (2013.01)

(52) U.S. Cl.
    CPC ....... *G06F 3/0488* (2013.01); *G06Q 30/0244* (2013.01); *G06T 1/0021* (2013.01); *G06T 3/0006* (2013.01); *H04N 21/41415* (2013.01); *H04N 21/8358* (2013.01)

(56) References Cited

U.S. PATENT DOCUMENTS

| | | | |
|---|---|---|---|
| 6,169,538 B1* | 1/2001 | Nowlan | G06F 3/0488 341/22 |
| 6,493,008 B1* | 12/2002 | Yui | G09G 5/08 348/E5.104 |
| 6,600,500 B1* | 7/2003 | Yamamoto | G06F 3/0481 715/779 |
| 7,956,869 B1* | 6/2011 | Gilra | G06F 3/0481 345/592 |
| 2002/0067433 A1* | 6/2002 | Yui | G09G 5/14 348/588 |
| 2006/0055710 A1* | 3/2006 | Lo | G09G 5/14 345/629 |
| 2006/0112354 A1* | 5/2006 | Park | G06F 3/0481 715/835 |
| 2006/0123183 A1 | 6/2006 | Koivisto et al. | |
| 2007/0247440 A1* | 10/2007 | Shin | G06F 3/04883 345/173 |
| 2008/0204424 A1* | 8/2008 | Jin | G06F 3/0482 345/173 |
| 2008/0276272 A1* | 11/2008 | Rajaraman | G06Q 30/02 725/37 |
| 2009/0144574 A1* | 6/2009 | Tseng | G06F 1/1616 713/323 |
| 2010/0026894 A1* | 2/2010 | Osawa | H04N 5/44591 348/564 |
| 2010/0077431 A1* | 3/2010 | Neufeld | G06F 3/0488 725/39 |
| 2010/0122214 A1* | 5/2010 | Sengoku | G06F 3/0485 715/830 |
| 2010/0153836 A1 | 6/2010 | Krassner et al. | |
| 2010/0231752 A1* | 9/2010 | Lodge | G09B 21/001 348/231.4 |
| 2010/0263946 A1* | 10/2010 | Miyazaki | G06F 3/04883 178/2 R |
| 2011/0258053 A1* | 10/2011 | Lee | G06Q 30/02 705/14.69 |
| 2012/0056902 A1* | 3/2012 | Yoshino | G09G 3/20 345/660 |
| 2012/0123874 A1 | 5/2012 | Park | |
| 2012/0174028 A1* | 7/2012 | Sirpal | G06F 1/1616 715/790 |
| 2013/0027719 A1* | 1/2013 | Tsuji | H04N 1/00424 358/1.9 |
| 2013/0038623 A1* | 2/2013 | Tezuka | G06F 3/04886 345/589 |
| 2013/0057577 A1* | 3/2013 | Jeong | H04N 13/04 345/629 |
| 2013/0100162 A1* | 4/2013 | Iseri | G09G 5/14 345/629 |
| 2013/0155185 A1* | 6/2013 | Nishida | G09G 5/14 348/43 |
| 2014/0036149 A1* | 2/2014 | Ogawa | H04N 5/44591 348/468 |
| 2014/0237428 A1* | 8/2014 | Miyazaki | G06F 3/0488 715/833 |
| 2014/0292760 A1* | 10/2014 | Shikolay | G06F 3/0485 345/428 |
| 2015/0042539 A1* | 2/2015 | Avrahami | G06F 3/1446 345/1.3 |
| 2015/0058792 A1* | 2/2015 | Gelernter | G06F 3/0485 715/784 |
| 2015/0121270 A1* | 4/2015 | Wang | G06F 3/0481 715/768 |
| 2015/0181200 A1* | 6/2015 | Arrasvuori | G06K 9/00 348/46 |
| 2015/0317286 A1* | 11/2015 | Wang | G06F 9/451 715/788 |
| 2015/0348495 A1* | 12/2015 | Kim | G06F 3/0484 345/156 |
| 2015/0363084 A1* | 12/2015 | Spjuth | G06T 11/60 715/716 |

FOREIGN PATENT DOCUMENTS

| | | | |
|---|---|---|---|
| JP | 2008-082813 | A | 4/2008 |
| JP | 2008-523488 | A | 7/2008 |
| JP | 2010-020770 | A | 1/2010 |
| JP | A-2010-526494 | | 7/2010 |
| JP | 2010-256405 | A | 11/2010 |
| JP | 2011128204 | A | 6/2011 |
| JP | 2012512483 | A | 5/2012 |
| JP | A-2012-137805 | | 7/2012 |
| JP | 2012-525624 | A | 10/2012 |
| JP | 2013-003718 | A | 1/2013 |
| JP | 2013-527939 | A | 7/2013 |
| JP | 2014-085793 | A | 5/2014 |
| WO | WO 2008/137482 | A1 | 11/2008 |
| WO | 2011148885 | A1 | 12/2011 |

OTHER PUBLICATIONS

Nov. 24, 2015 Office Action issued in Japanese Patent Application No. 2014-258949.
Nov. 17, 2015 Office Action issued in Japanese Patent Application No. 2014-258950.
Nov. 17, 2015 Office Action issued in Japanese Patent Application No. 2014-258948.
Nov. 17, 2015 Office Action issued in Japanese Patent Application No. 2014-258947.
Nov. 17, 2015 Office Action issued in Japanese Patent Application No. 2014-258946.
Okibayashi, M., "11-2 Make elements draggable," "Create Ajax application by jQuery," Jul. 25, 2008, pp. 234-241, published by Gijutsu-Hyohron Co., Ltd.
Feb. 16, 2016 Office Action issued in Japanese Patent Application No. 2014-258946.
Feb. 16, 2016 Office Action issued in Japanese Patent Application No. 2014-258947.
Feb. 16, 2016 Office Action issued in Japanese Patent Application No. 2014-258948.
Feb. 16, 2016 Office Action issued in Japanese Patent Application No. 2014-258949.
Jun. 7, 2016 Office Action issued in Japanese Patent Application No. 2014-258949.
Jun. 7, 2016 Office Action issued in Japanese Patent Application No. 2014-258947.
Oct. 21, 2014 Office Action issued in Japanese Patent Application No. 2013-195845.
May 9, 2017 Office Action issued in Japanese Patent Application No. 2015-035852.

(56) References Cited

OTHER PUBLICATIONS

Apr. 11, 2017 Office Action issued in Japanese Patent Application No. 2014-258949.
Nov. 7, 2017 Office Action issued in Japanese Patent Application No. 2015-035852.

* cited by examiner

| ADVERTISER ID | ADVERTISEMENT CONTENT | BID PRICE | CTR |
|---|---|---|---|
| B10 | C11 | 100 | 0.02 |
| | C12 | 50 | 0.01 |
| | C13 | 150 | 0.02 |
| | ... | ... | ... |
| B20 | C21 | 100 | 0.01 |
| | C22 | 50 | 0.02 |
| | ... | ... | ... |
| ... | ... | ... | ... |

DISTRIBUTION APPARATUS, A TERMINAL APPARATUS, AND A DISTRIBUTION METHOD FOR CONTROLLING TRANSPARENCY OF MULTIPLE CONTENTS DISPLAYED ON A DISPLAY IN RESPONSE TO AN INPUT OPERATION

CROSS-REFERENCE TO RELATED APPLICATION(S)

The present application claims priority to and incorporates by reference the entire contents of Japanese Patent Application No. 2013-195845 filed in Japan on Sep. 20, 2013.

BACKGROUND OF THE INVENTION

1. Field of the Invention

The present invention relates to a distribution apparatus, a terminal apparatus and a distribution method.

2. Description of the Related Art

Recently, advertisement distribution through the Internet has been actively performed. For example, it is performed to display advertisement content related to a company, a product, or the like on a predetermined position of a web page. The advertisement content is, for example, an icon such as a static image, a dynamic image, or text data, and a hyperlink (hereinafter, simply referred to as "link") to a web page provided by an advertiser (hereinafter, referred to as advertiser page) is provided thereto. Then, when the advertisement content is clicked by a user, the advertiser page is displayed. As a technique related to such advertisement display, a technique to display information content on a first layer and to display advertisement content on a second layer which is behind the information content has been proposed.

However, in the related art described above, visibility of content may be lowered. Specifically, in the related art in which advertisement content is displayed on the second layer, the advertisement content is just displayed behind information content. Thus, when this related art is used, it may become difficult for a user to visually recognize either or both of the information content and advertisement content.

SUMMARY OF THE INVENTION

It is an object of the present invention to at least partially solve the problems in the conventional technology.

According to one aspect of an embodiment, a distribution apparatus includes a memory storing a first content and control information, and a processor operatively coupled to the memory, the processor being programmed to distribute the control information and the first content to a terminal apparatus. The control information causes the terminal apparatus to execute: displaying the first content superimposed onto a second content in a display region of a display of the terminal apparatus in a first display mode, the second content having a higher transparency than the first content such that only the first content is visible in the display region of the terminal apparatus; detecting an input operation causing the first content to move relative to the display region of the display of the terminal apparatus; in response to the detected input operation being performed and the first content moving relative to the display region, changing the first display mode to a second display mode by changing a transparency of at least one of the first content and the second content, such that the first content and the second content are visible in the display region of the display of the terminal apparatus; and in response to completion of the input operation and the first content not moving relative to the display region, changing the second display mode to the first display mode such that only the first content is visible in the display region of the display of the terminal apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, a form to embody a distribution apparatus, a terminal apparatus, a distribution method, and a distribution program (hereinafter, referred to as "embodiment") according to the present application will be described in detail with reference to the drawings. Note that the distribution apparatus, the terminal apparatus, the distribution method, and the distribution program according to the present application are not limited by the embodiment. Also, in each embodiment in the following, the same reference signs are assigned to the same parts and overlapping description is omitted.

1. Display Processing

Figure 1:
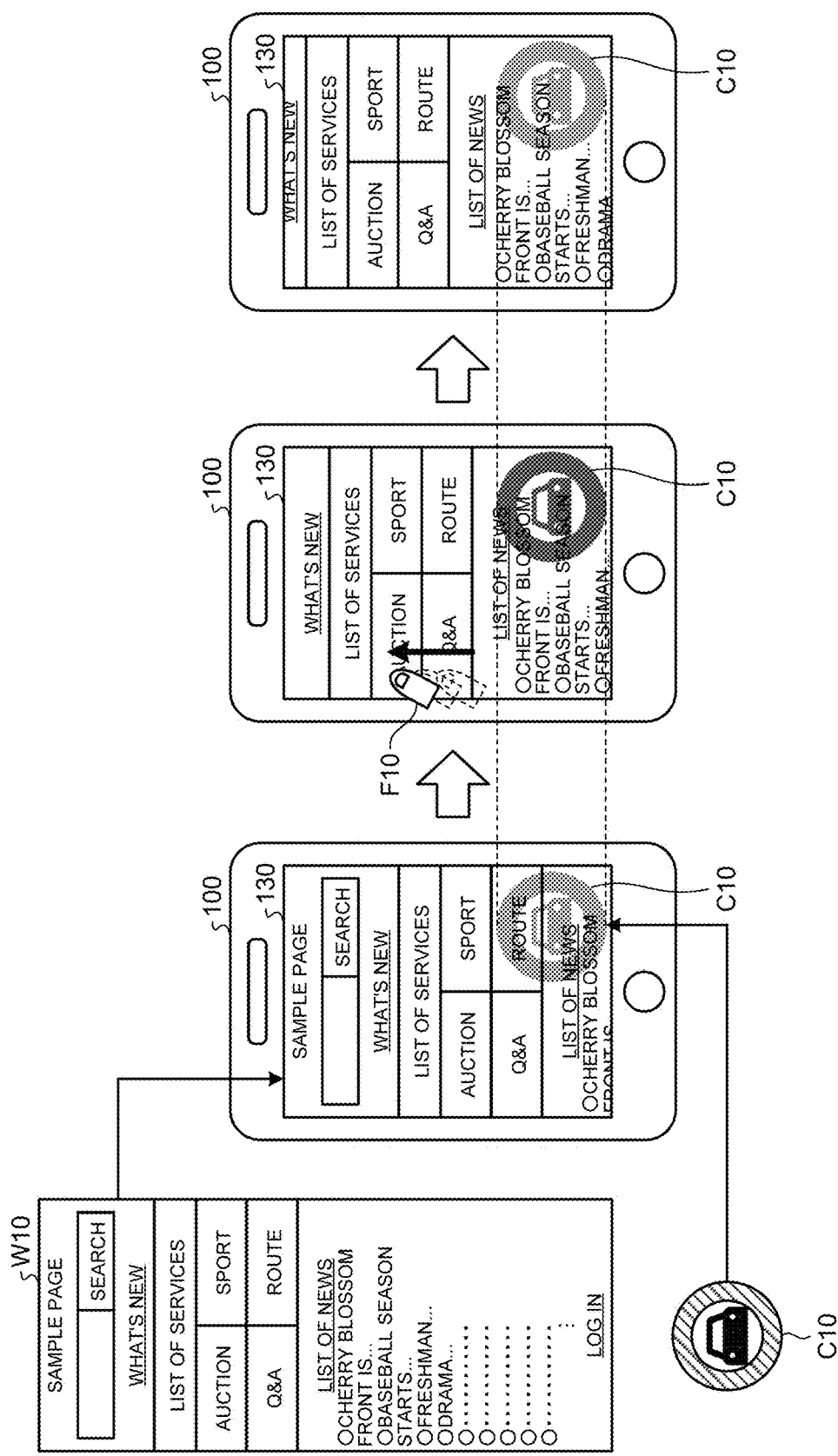
FIG. 1 is a view illustrating an example of display processing according to an embodiment.

First, with reference to FIG. 1, an example of display processing according to an embodiment will be described. FIG. 1 is a view illustrating an example of the display processing according to the embodiment. In FIG. 1, an example in which a web page W10 and advertisement content C10 are displayed by a terminal apparatus 100 is illustrated.

The terminal apparatus 100 illustrated in FIG. 1 is a mobile terminal apparatus such as a smartphone. Also, the terminal apparatus 100 includes an output unit 130 such as a liquid crystal display. Note that it is assumed that a touch panel is employed as the terminal apparatus 100. That is, a user of the terminal apparatus 100 performs various operations by touching a display surface of the output unit 130 with a finger or a special pen.

The web page W10 is content for a portal website to which various kinds of information such as news are posted. Here, it is assumed that a size of the web page W10 in a longitudinal direction is larger than a display size in a longitudinal direction of the output unit 130 of the terminal apparatus 100.

Such a web page W10 includes, for example, an entry field, to which a search keyword is input, and a link to a different web page. In a case of an example in FIG. 1, each itemized news topic posted under "what's new" or "list of news" displayed on the web page W10 corresponds no an anchor text to which a link to a different web page is provided. Also, each of "auction", "sport", "Q&A", and "route" displayed on the web page W10 corresponds to a button or an image to which a link to a different web page is provided. In the following, in a display area of the web page W10, an area in which an anchor text, a button, an image, or the like, to which a link to a different web page is provided, is displayed may be referred to as a "link area".

The advertisement content C10 is, for example, a static image or a dynamic image and is provided, for example, by an automobile related advertiser. For example, the advertisement content C10 is what is known widely to the public and corresponds, for example, to a logo of an advertiser. That is, the advertisement content C10 includes an identification function to distinguish an advertiser, which provides the advertisement content C10, from a different advertiser. Thus, a general user can identify an advertiser from the advertisement content C10.

Here, the terminal apparatus 100 displays the web page W10 and the advertisement content C10 in a superimposed manner and in such a manner that a user can visually recognize both of the web page W10 and the advertisement content C10. In other word, the terminal apparatus 100 superposably displays the web page W10 and the advertisement content C10. For example, the terminal apparatus 100 processes the advertisement content C10 into a pixel having one color such as gray and displays the processed advertisement content C10 and the web page W10 in a superimposed manner. Here, the terminal apparatus 100 displays the advertisement content C10 in such a manner that the processed advertisement content C10 can be seen through the web page W10 in predetermined transparency (hereinafter, referred to as "first transparency"). Note that since it is not possible to display the whole of the web page W10, in an initial state, the terminal apparatus 100 displays the web page W10 from a head thereof.

In such a manner, the terminal apparatus 100 displays the advertisement content C10 like a shadow placed behind the web page W10. Here, to the advertisement content C10, a link to an advertiser page provided by an advertiser may be provided. However, in the case of the example in FIG. 1, the terminal apparatus 100 displays the advertisement content C10 in a not clickable state. That is, the terminal apparatus 100 displays the advertisement content C10 simply as a shadow. On the other hand, the terminal apparatus 100 displays the whole of the link area included in the web page W10 in a clickable state. That is, in the link area on the web page W10, the terminal apparatus 100 displays even a link area, which is superimposed on the advertisement content C10, in a clickable state.

Note that the described "clickable state" indicates a state in which content such as the advertisement content C10 can be selected and can transition into a different web page (including advertiser page) when being clicked. Also, "not clickable state" indicates a state in which content such as the advertisement content C10 cannot be selected and does not transition into a different web page (including advertiser page) even when clicked. For example, even when the advertisement content C10 is clicked, the terminal apparatus 100 keeps displaying the web page W10. However, when a link area displayed on the web page W10 is clicked, the terminal apparatus 100 accesses a link destination of the clicked link area.

Then, when a scrolling operation to move the web page W10 is performed by a user, the terminal apparatus 100 according to the embodiment varies a display mode (or a display form) of the advertisement content C10. For example, the terminal apparatus 100 displays a display mode of the advertisement content C10 in such a manner that the display mode makes the advertisement content C10 of when the scrolling operation is performed attract more attention of a user than the advertisement content C10 of when the scrolling operation is not performed.

In FIG. 1, an example in which the scrolling operation is performed by a finger F10 of a user is illustrated. In this case, the terminal apparatus 100 displays the advertisement content C10 in second transparency, which is lower than the first transparency, while the scrolling operation is performed. In other words, the terminal apparatus 100 displays the advertisement content C10 in a darker color when the scrolling operation is performed.

Also, as illustrated in FIG. 1, the terminal apparatus 100 according to the embodiment displays the advertisement content C10 on a fixed position even when a display area of the web page W10 is varied in response to the scrolling operation. That is, the terminal apparatus 100 displays the advertisement content C10 on a fixed position, the advertisement content C10 not being linked to the movement of the web page W10.

Then, it is assumed that the user stops performing the scrolling operation. In this case, as illustrated in FIG. 1, the terminal apparatus 100 restores the display mode of the advertisement content C10 to the former state. Specifically, the terminal apparatus 100 displays the advertisement content C10 in the first transparency.

That is, in the case of the example in FIG. 1, the terminal apparatus 100 displays the advertisement content C10 in the first transparency while the scrolling operation is not performed and displays the advertisement content C10 in the second transparency, which is lower than the first transparency, while the scrolling operation is performed. Thus, the terminal apparatus 100 can display the advertisement content C10 in an emphasized manner only when an operation to move the web page W10 is performed by a user.

In such a manner, by displaying the advertisement content C10 in an emphasized manner only while the scrolling operation is performed, the terminal apparatus 100 according to the embodiment can prevent the visibility of the web page W10 and advertisement content C10 from being lowered. Specifically, a user not performing the scrolling operation may be looking carefully at an article or the like posted on the web page W10. Thus, as illustrated in the example in FIG. 1, the terminal apparatus 100 displays the advertisement content C10 in a light color when the scrolling operation is not performed, whereby the visibility of the web page W10 for the user browsing the web page W10 can be prevented from being lowered. On the other hand, it is not likely that a user performing the scrolling operation is looking at the moving web page W10 itself. Thus, the terminal apparatus 100 displays the advertisement content C10 in a deep color only while the scrolling operation is performed, and thus, it is possible to make a user not focusing on the web page W10 to visually recognize the advertisement content C10.

Also, since the terminal apparatus 100 according to the embodiment can make a user focus on the advertisement content C10 by displaying the advertisement content C10 in an emphasized manner only while the scrolling operation is performed, advertisement effect of the advertisement content C10 can be improved. Specifically, as described above, a user not performing the scrolling operation may be looking carefully at an article or the like posted on the web page W10. In this case, it can be considered that it is difficult to improve the advertisement effect even if the advertisement content C10 itself on the web page W10 is displayed. Since the terminal apparatus 100 according to the embodiment displays the advertisement content C10 in an emphasized manner only while the scrolling operation is performed, it is possible to make a user focus on the advertisement content C10. As a result, the terminal apparatus 100 can make an advertiser, which is recalled from the advertisement content C10, penetrate a user, and thus, advertisement effect of the advertisement content C10 can be improved.

Moreover, since the terminal apparatus 100 according to the embodiment displays the advertisement content C10 as a shadow in such a manner that the web page W10 is superimposed thereon, it is possible to impress the advertisement content C10 on a user strongly. Specifically, since the terminal apparatus 100 can make the advertisement content C10 more likely to be seen by a user browsing the web page W10 by displaying the advertisement content C10 in such a manner that the web page W10 is superimposed thereon, advertisement effect of the advertisement content C10 can be improved.

From what has been described above, the terminal apparatus 100 according to the embodiment can prevent visibility of the web page W10 and advertisement content C10 from being lowered and can improve advertisement effect of the advertisement content C10.

In the following, the terminal apparatus 100 or the like to realize the described display processing will be described. Note that although description has been omitted in the above, the described web page W10 includes control information to control display modes of the web page W10 and the advertisement content C10. Then, the terminal apparatus 100 performs the described display processing according to the control information. Such control information will be described later. Also, in the following, in a case of illustrating state transition of the terminal apparatus 100, drawings may be referred to as a first state, a second state, . . . , and an Nth state from the left.

2. Configuration of Advertisement Distribution System

Figure 2:
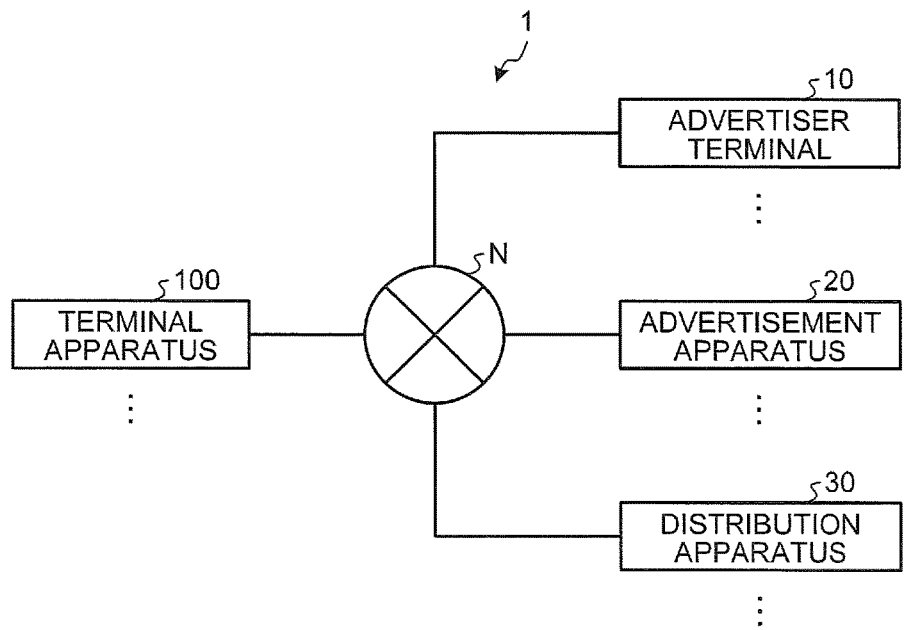
FIG. 2 is a view illustrating an example configuration of an advertisement distribution system according to the embodiment.

Next, with reference to FIG. 2, a configuration of an advertisement distribution system according to the embodiment will be described. FIG. 2 is a view illustrating an example configuration of the advertisement distribution system 1 according to the embodiment. As illustrated in FIG. 2, the advertisement distribution system 1 includes the terminal apparatus 100, an advertiser terminal 10, an advertisement apparatus 20, and a distribution apparatus 30. The terminal apparatus 100, the advertiser terminal 10, the advertisement apparatus 20, and the distribution apparatus 30 are connected in a communicable manner by wired or wireless connection through a network N. Note that the advertisement distribution system 1 illustrated in FIG. 2 may include a plurality of terminal apparatuses 100, a plurality of advertiser terminals 10, a plurality of advertisement apparatuses 20, and a plurality of distribution apparatuses 30.

The terminal apparatus 100 is an information processing apparatus used by a user browsing a web page. For example, the terminal apparatus 100 is a mobile phone such as a smartphone, a tablet terminal, a personal digital assistant (PDA), a desktop personal computer (PC), a notebook PC, or the like. According to an operation by a user, the terminal apparatus 100 acquires a web page from the distribution apparatus 30 and displays the acquired web page. Also, when the web page includes an advertisement acquisition instruction which will be described later, the terminal apparatus 100 acquires advertisement content from the advertisement apparatus 20 and displays the acquired advertisement content with the web page.

The advertiser terminal 10 is an information processing apparatus used by an advertiser. For example, the advertiser terminal 10 is a desktop PC, a notebook PC, a tablet terminal, a mobile phone, a PDA, or the like. According to an operation by the advertiser, the advertiser terminal 10 submits advertisement content to the advertisement apparatus 20. For example, the advertiser terminal 10 submits, to the advertisement apparatus 20, a static image, a dynamic image, text data, a uniform resource locator (URL) to access an advertiser page distributed by an advertiser server controlled by the advertiser, or the like as the advertisement content.

Note that the advertiser may ask an agent to submit advertisement content. In this case, the agent submits advertisement content to the advertisement apparatus 20. In the following, a word "advertiser" includes not only an advertiser but also an agent. A word "advertiser terminal" includes not only the advertiser terminal 10 but also an agent apparatus used by the agent.

The advertisement apparatus 20 is a server apparatus which distributes advertisement content submitted by the advertiser terminal 10. For example, when being accessed by the terminal apparatus 100, the advertisement apparatus 20 distributes the advertisement content to the terminal apparatus 100.

The distribution apparatus 30 is, for example, a web server or the like to distribute a web page to the terminal apparatus 100. For example, the distribution apparatus 30 distributes various web pages related to a portal website, a news site, an auction site, a weather forecast site, a shopping site, a finance (stock price) site, a route searching site, a map providing site, a travel site, a restaurant introduction site, a weblog, and the like.

The web page distributed by the distribution apparatus 30 is formed, for example, by a hypertext markup language (HTML) file described in HTML or an extensible markup language (XML) file described in XML. Then, the web page distributed by the distribution apparatus 30 includes control information to control display modes of the web page and the advertisement content. The control information is described, for example, into an HTML file or the like, which forms a web page, in script language such as JavaScript® or cascading style sheets (CSS).

Also, the web page distributed by the distribution apparatus 30 includes an advertisement acquisition instruction. For example, a URL or the like of the advertisement apparatus 20 is described into the HTML file or the like, which forms the web page, as the advertisement acquisition instruction. In this case, the terminal apparatus 100 acquires advertisement content from the advertisement apparatus 20 by accessing the URL described in the HTML file or the like.

Note that each of various kinds of data distributed from the distribution apparatus 30 to the terminal apparatus 100 is actually an HTML file, an image, or the like which forms a web page. However, in the following, the various kinds of data distributed from the distribution apparatus 30 to the terminal apparatus 100 may be referred to as a "web page".

3. Configuration of Advertisement Apparatus

Figure 3:
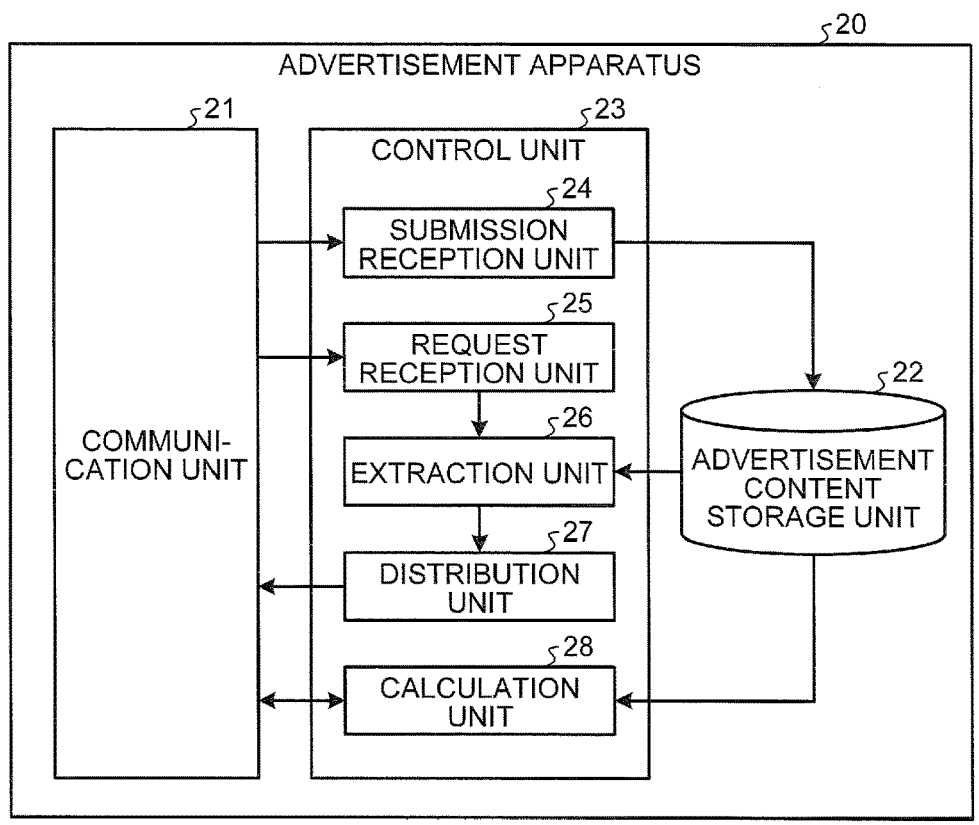
FIG. 3 is a view illustrating an example configuration of an advertisement apparatus according to the embodiment.

Next, with reference to FIG. 3, a configuration of the advertisement apparatus 20 according to the embodiment will be described. FIG. 3 is a view illustrating an example configuration of the advertisement apparatus 20 according to the embodiment. As illustrated in FIG. 3, the advertisement apparatus 20 includes a communication unit 21, an advertisement content storage unit 22, and a control unit 23.

The communication unit 21 is realized, for example, by a network interface card (NIC) or the like. Then, the communication unit 21 is connected to the network N by wired or wireless and transmits/receives information to/from the terminal apparatus 100, the advertiser terminal 10, or the distribution apparatus 30.

The advertisement content storage unit 22 is realized, for example, by a semiconductor memory element such as a random access memory (RAM) or a flash memory, or a storage apparatus such as a hard disk or an optical disk. Then, the advertisement content storage unit 22 stores various kinds of information related to advertisement content submitted by the advertiser terminal 10.

Figures 4, 5:
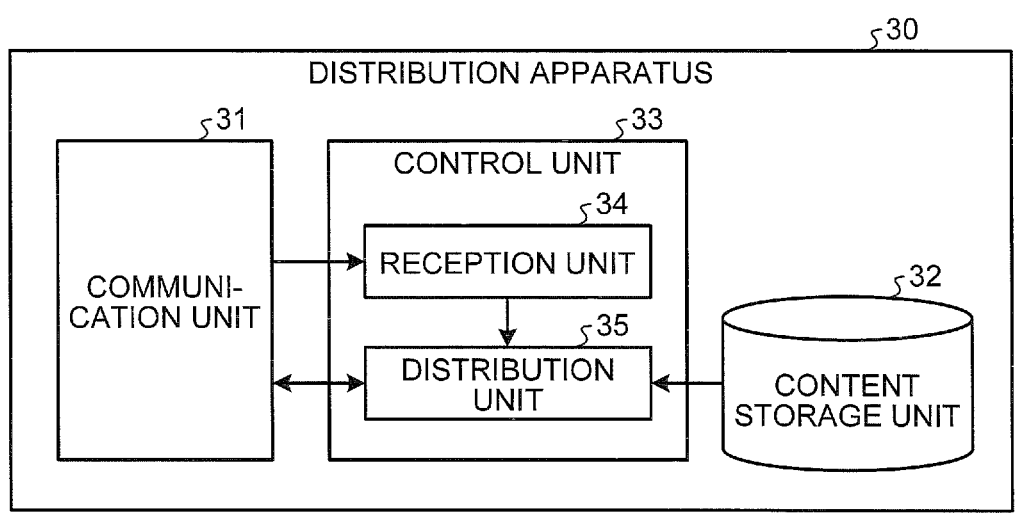
FIG. 4 is a view illustrating an example of an advertisement content storage unit according to the embodiment.
FIG. 5 is a view illustrating an example configuration of a distribution apparatus according to the embodiment.

Here, in FIG. 4, an example of the advertisement content storage unit 22 according to the embodiment is illustrated. In the example illustrated in FIG. 4, the advertisement content storage unit 22 includes items such as an "advertiser ID", "advertisement content", a "bid price", and a "click through rate (CTR)".

The "advertiser ID" indicates identification information to identify an advertiser or an advertiser terminal 10. The "advertisement content" indicates advertisement content submitted by an advertiser terminal 10. In FIG. 4, an example in which conceptual information such as "C11" is stored into the "advertisement content" is illustrated. However, actually, a static image, a dynamic image, text data, a URL, a file path name indicating a storage place thereof, or the like is housed.

The "bid price" indicates an advertising fee designated by an advertiser when the advertiser submits advertisement content. For example, the "bid price" corresponds to a unit price paid by the advertiser to an advertisement distributer (such as administrator of advertisement apparatus 20 or distribution apparatus 30) when the advertisement content is displayed once on a web page. Also, for example, the "bid price" corresponds to a unit price paid by the advertiser to the advertisement distributer when the advertisement content is clicked once by a user.

The "CTR" indicates a value in which the number of times advertisement content is clicked is divided by the number of times the advertisement content is displayed. Note that to the CTR of advertisement content which is not yet distributed to the terminal apparatus 100, a predetermined fixed value, an average value of CTRs of all pieces of advertisement content, an average value of CTRs of all pieces of advertisement content which belong to the same advertisement category (such as car or travel), or the like is stored. Also, to the "CTR", a prediction CTR which is predicted by a prediction model or the like of a CTR may be stored. Such a prediction CTR is predicted, for example, by a type of advertisement content, a type of a web page on which advertisement content is displayed, or the like.

That is, in FIG. 4, an example in which an advertiser identified by an advertiser ID "B10" designates a bid price "100" and submits advertisement content "C11" is illustrated. Also, in FIG. 4, an example in which a CTR of the advertisement content "C11" is "0.02" is illustrated.

The control unit 23 is realized, for example, in the following manner. That is, various programs stored in a storage apparatus inside the advertisement apparatus 20 are executed, with a RAM as a work area, by a central processing unit (CPU), a micro processing unit (MPU), or the like. Also, for example, the control unit 23 is realized by an integrated circuit such as an application specific integrated circuit (ASIC) or a field programmable gate array (FPGA).

As illustrated in FIG. 3, the control unit 23 includes a submission reception unit 24, a request reception unit 25, an extraction unit 26, a distribution unit 27, and a calculation unit 28. The control unit 23 realizes or executes a function or an effect of information processing described in the following. Note that an internal configuration of the control unit 23 is not limited to the configuration illustrated in FIG. 3 and may be a different configuration as long as information processing described later is performed therein. Also, a connection relationship among the processing units included in the control unit 23 is not limited to a connection relationship illustrated in FIG. 3 and may be a different connection relationship.

The submission reception unit 24 receives submission of advertisement content from the advertiser terminal 10. Specifically, the submission reception unit 24 receives designation of a bid price and the submission of advertisement content. Then, the submission reception unit 24 stores the received bid price and advertisement content into the advertisement content storage unit 22, the received bid price and advertisement content being associated with an advertiser ID corresponding to an advertiser in a submission source.

The request reception unit 25 receives, from the terminal apparatus 100, an acquisition request for advertisement content. For example, the request reception unit 25 receives an HTTP request as the acquisition request for advertisement content.

When the acquisition request for advertisement content is received by the request reception unit 25, the extraction unit 26 extracts advertisement content, which is a distribution candidate, from the advertisement content storage unit 22. For example, among the advertisement content stored in the advertisement content storage unit 22, the extraction unit 26 gives priority to advertisement content with a high bid price or high CTR or advertisement content with a high bid price and high CTR when extracting.

However, the extraction is not limited to this example. The extraction unit 26 may use an advertisement distribution method called content matching, in which method advertisement content related to a web page is extracted. Also, when a web page is a search page, the extraction unit 26 may use an advertisement distribution method called search-based advertising, in which method advertisement content which matches a search keyword designated in the search page is extracted. Also, the extraction unit 26 may use an advertisement distribution method called a targeting distribution, in which method advertisement content which matches attribute information of a user (such as psychographic attribute or demographic attribute) is extracted.

The distribution unit 27 distributes advertisement content stored in the advertisement content storage unit 22. Specifically, the distribution unit 27 distributes advertisement content, which is extracted by the extraction unit 26, to the terminal apparatus 100 which has transmitted an acquisition request for advertisement content.

The calculation unit 28 calculates a charging amount charged to an advertiser as an advertisement distribution fee or a payment amount which is paid, as an advertisement display fee, to an information provider who creates a web page and runs various sites. For example, the calculation unit 28 calculates a charging amount charged to an advertiser based on a bid price stored in the advertisement content storage unit 22 and the number of times advertisement content is displayed on a web page. However, the calculation is not limited to this example. The calculation unit 28 may calculate the charging amount based on the number of times advertisement content is clicked by a user. Also, the calculation unit 28 calculates the payment amount paid to an information provider based on the number of times advertisement content is distributed to the advertisement apparatus 20.

4. Configuration of Distribution Apparatus

Next, with reference to FIG. 5, a configuration of the distribution apparatus 30 according to the embodiment will be described. FIG. 5 is a view illustrating an example configuration of the distribution apparatus 30 according to the embodiment. As illustrated in FIG. 5, the distribution apparatus 30 includes a communication unit 31, a content storage unit 32, and a control unit 33.

The communication unit 31 is realized, for example, by an NIC. Then, the communication unit 31 is connected to the network N by wired or wireless connection and transmits/receives information to/from the terminal apparatus 100 or the advertisement apparatus 20.

The content storage unit 32 is realized, for example, by a semiconductor memory element such as a RAM or a flash memory, or a storage apparatus such as a hard disk or an optical disk. Then, the content storage unit 32 stores a web page which is an example of content. For example, the content storage unit 32 stores an HTML file which forms a web page or a static image or a dynamic image which is displayed on a web page.

The web page stored into the content storage unit 32 includes an advertisement acquisition instruction to acquire advertisement content. Also, the web page stored into the content storage unit 32 includes control information which is a program described in script language such as JavaScript® or CSS.

Here, control by control information included in a web page will be described. The control information according to the embodiment makes the terminal apparatus 100 execute a display step, a detection step, and a variation step. The display step is, for example, a processing step to display a web page and advertisement content in a superimposed manner. Also, the detection step is a processing step to detect a moving operation to move the web page displayed in the display step. Note that the moving operation according to the embodiment corresponds to an operation to scroll a web page. Also, the variation step is a processing step to vary a display mode of advertisement content when the moving operation is detected in the detection step. Also, other than the processing steps above, the control information makes the terminal apparatus 100 execute a processing step to determine a display position of the advertisement content, or the like.

The control unit 33 is realized, for example, in the following manner. That is, various programs (corresponding to example of distribution program) stored in a storage apparatus inside the distribution apparatus 30 are executed, with a RAM as a work area, by a CPU, an MPU, or the like. Also, the control unit 33 is realized, for example, by an integrated circuit such as an ASIC or an FPGA.

As illustrated in FIG. 5, the control unit 33 includes a reception unit 34 and a distribution unit 35. The control unit 33 realizes or executes a function or an effect of information processing described in the following. Note that an internal configuration of the control unit 33 is not limited to the configuration illustrated in FIG. 5 and may be a different configuration as long as information processing described later is performed therein. Also, a connection relationship among the processing units included in the control unit 33 is not limited to a connection relationship illustrated in FIG. 5 and may be a different connection relationship.

The reception unit 34 receives an acquisition request for a web page from the terminal apparatus 100. For example, the reception unit 34 receives an HTTP request as the acquisition request for a web page.

When the acquisition request for a web page is received by the reception unit 34, the distribution unit 35 distributes a web page and control information to the terminal apparatus 100. Specifically, the distribution unit 35 acquires a web page, which is an object of the acquisition request, from the content storage unit 32 and distributes the acquired web page to the terminal apparatus 100. As described, since the web page stored into the content storage unit 32 includes control information, the distribution unit 35 distributes the web page and the control information.

Note that the described content storage unit 32 may store the web page and the control information separately instead of the web page including the control information. For example, the content storage unit 32 may store an HTML file, which forms a web page, and a file, in which control information is described, in an associated manner. In this case, the distribution unit 35 distributes both of the web page and the control information to the terminal apparatus 100.

5. Configuration of Terminal Apparatus

Figure 6:
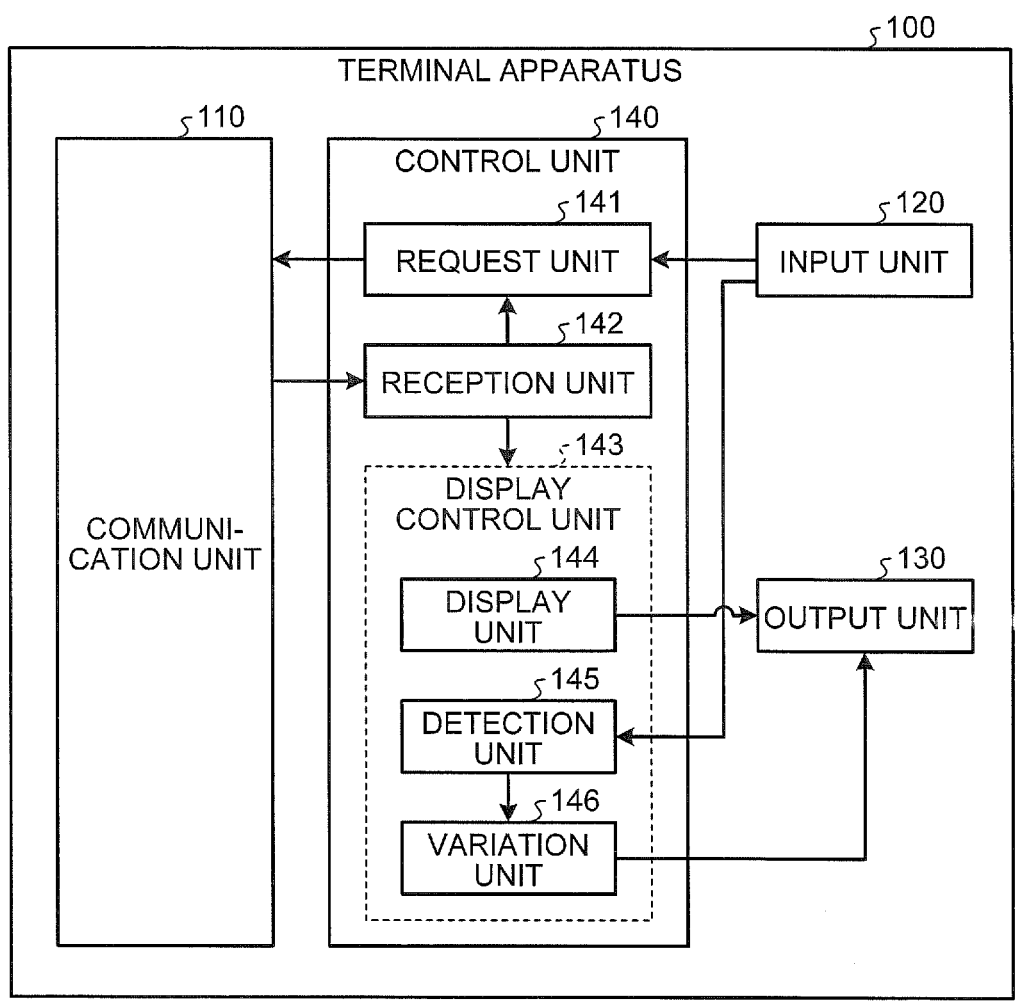
FIG. 6 is a view illustrating an example configuration of a terminal apparatus according to the embodiment.

Next, with reference to FIG. 6, a configuration of the terminal apparatus 100 according to the embodiment will be described. FIG. 6 is a view illustrating an example configuration of the terminal apparatus 100 according to the embodiment. As illustrated in FIG. 6, the terminal apparatus 100 includes a communication unit 110, an input unit 120, an output unit 130, and a control unit 140.

The communication unit 110 is realized, for example, by an NIC. The communication unit 110 is connected to the network N by wired or wireless connection and transmits/receives information to/from the advertisement apparatus 20 or the distribution apparatus 30.

The input unit 120 is an input apparatus to receive various operations of a user. For example, the input unit 120 is realized by a keyboard, a mouse, an operation key, or the like. The output unit 130 is a display apparatus to display various kinds of information. For example, the output unit 130 is realized by a liquid crystal display or the like. Note that when a touch panel is employed as the terminal apparatus 100, the input unit 120 and the output unit 130 are combined.

The control unit 140 is realized, for example, in the following manner. That is, various programs (corresponding to example of display program) stored in a storage apparatus inside the terminal apparatus 100 are executed, with a RAM as a work area, by a CPU, an MPU, or the like. For example, each of the various programs corresponds to an application program called a web browser. Also, the control unit 140 is realized, for example, by an integrated circuit such as an ASIC or an FPGA.

As illustrated in FIG. 6, the control unit 140 includes a request unit 141, a reception unit 142, and a display control unit 143. The control unit 140 realizes or executes a function or an effect of information processing described in the following. Note that an internal configuration of the control unit 140 is not limited to the configuration illustrated in FIG. 6 and may be a different configuration as long as information processing described later is performed therein. Also, a connection relationship among the processing units included in the control unit 140 is not limited to a connection relationship illustrated in FIG. 6 and may be a different connection relationship.

According to a user operation received through the input unit 120, the request unit 141 transmits an acquisition request for a web page to the distribution apparatus 30. Also, when a web page received by the reception unit 142 includes an advertisement acquisition instruction, the request unit 141 transmits an acquisition request for advertisement content to the advertisement apparatus 20.

The reception unit 142 receives a web page and advertisement content. Specifically, the reception unit 142 receives a web page from the distribution apparatus 30 which responds to the acquisition request for a web page, which request is transmitted by the request unit 141. Here, when the web page includes an advertisement acquisition instruction, the reception unit 142 instructs the request unit 141 to transmit an acquisition request for advertisement content. Then, the reception unit 142 receives advertisement content from the advertisement apparatus 20 which responds to the acquisition request for advertisement content, which request is transmitted by the request unit 141.

According to control information included in the web page received by the reception unit 142, the display control unit 143 performs display control of the web page and the advertisement content on the output unit 130. As illustrated in FIG. 6, the display control unit 143 includes a display unit 144, a detection unit 145, and a variation unit 146. The display unit 144, the detection unit 145, and the variation unit 146 are realized, for example, in the following manner. That is, the control information included in the web page is executed, with an RAM as a work area, by a CPU, an MPU, or the like. That is, the display unit 144 is realized by the described display step. The detection unit 145 is realized by the described detection step. The variation unit 146 is realized by the described variation step.

The display unit 144 displays the web page and the advertisement content received by the reception unit 142 in a superimposed manner on the output unit 130. Specifically, the display unit 144 specifies a predetermined display position of the advertisement content. Subsequently, the display unit 144 processes the advertisement content, for example, into a pixel having one color such as gray. Then, the display unit 144 displays the web page and the advertisement content in a superimposed manner and in such a manner that the processed advertisement content can be seen through the web page in the first transparency. That is, the display unit 144 displays the advertisement content like a shadow placed behind the web page.

The detection unit 145 detects a moving operation to move the web page displayed by the display unit 144. The detection unit 145 according to the embodiment detects, as an example of the moving operation, a scrolling operation on the web page.

When a scrolling operation is detected by the detection unit 145, the variation unit 146 varies a display mode of the advertisement content displayed by the display unit 144. Specifically, the variation unit 146 according to the embodiment varies transparency of the advertisement content from the first transparency into the second transparency (<first transparency) while the scrolling operation is detected by the detection unit 145. That is, the variation unit 146 makes a display color of the advertisement content darker while the scrolling operation is performed by a user.

6. Different Display Example

In the above, the display processing by the terminal apparatus 100 is described with reference to the display mode exemplified in FIG. 1. Specifically, in the above, an example in which the terminal apparatus 100 varies the display mode of the advertisement content while the scrolling operation is detected is illustrated. Here, with reference to FIG. 7 and FIG. 8, the scrolling operation detected by the terminal apparatus 100 will be described in detail. Each of FIG. 7 and FIG. 8 is a view illustrating an example of the display processing according to the embodiment.

6-1. First Different Display Example

First, an example in FIG. 7 will be described. As illustrated in a first state in FIG. 7, similarly to the example in FIG. 1, the terminal apparatus 100 displays the web page W10 and the advertisement content C10 in a superimposed manner. Then, as illustrated in a second state in FIG. 7, the terminal apparatus 100 varies a display mode of the advertisement content while a scrolling operation is detected. The display processing by the terminal apparatus 100 up to this point is similar to that in the example illustrated in FIG. 1.

Figure 7:
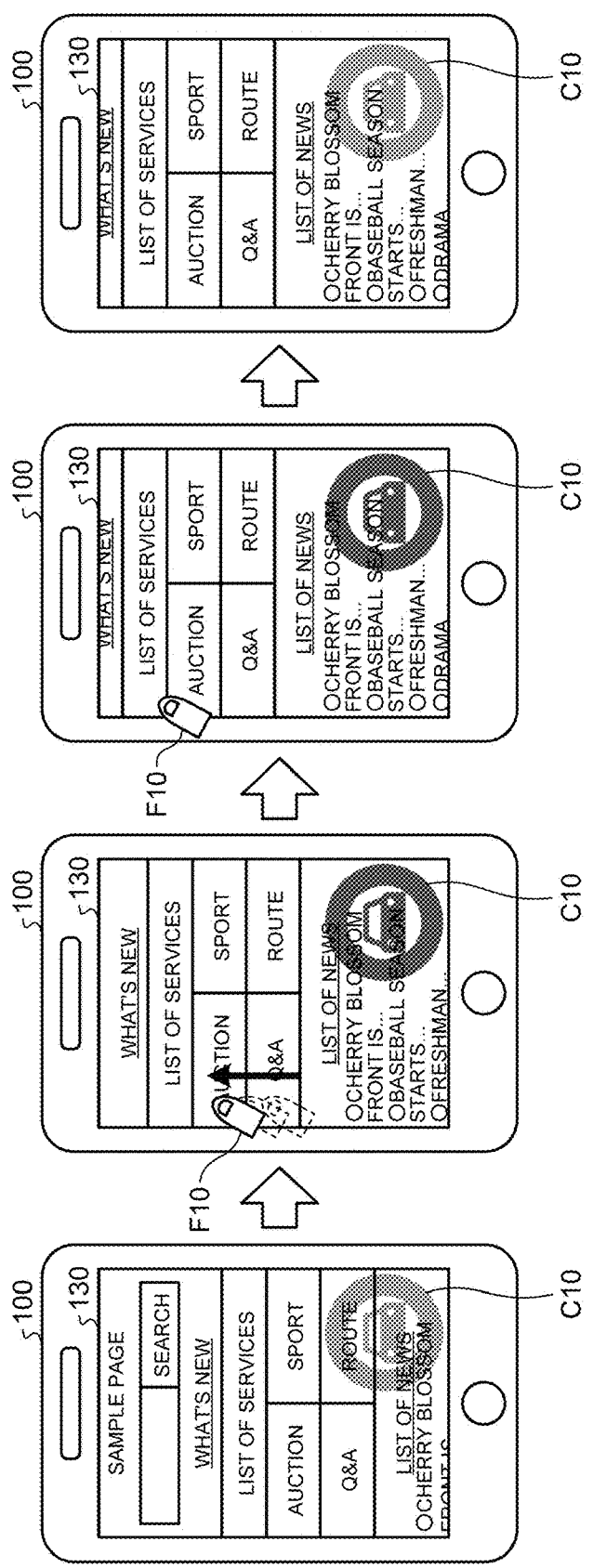
FIG. 7 is a view illustrating an example of the display processing according to the embodiment.
Figure 8:
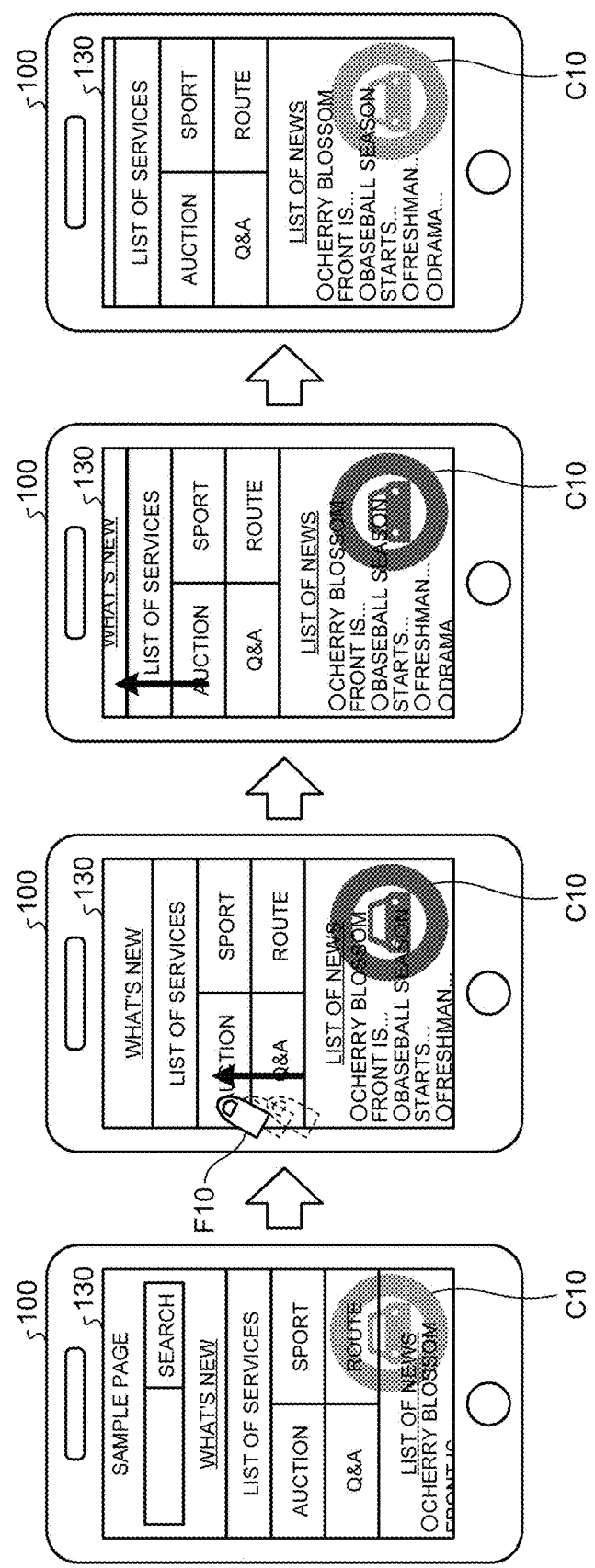
FIG. 8 is a view illustrating an example of the display processing according to the embodiment.

Here, as illustrated in a third state in FIG. 7, it is assumed that a user does not make a finger F10, with which the scrolling operation is performed in the second state, let go of the web page W10 and keeps selecting (in this example, tapping) the web page W10. In this case, similarly to the second state, the terminal apparatus 100 keeps the display mode of the advertisement content C10 varied while the web page W10 is selected. Then, as illustrated in a fourth state in FIG. 7, when the web page W10 is no longer selected after the scrolling operation, the terminal apparatus 100 restores the display mode of the advertisement content C10 to the first state.

Specifically, when detecting the scrolling operation on the web page W10, the detection unit 145 of the terminal apparatus 100 detects whether the web page W10 is no longer selected after the scrolling operation. Then, when detecting that the web page W10 is no longer selected, the detection unit 145 determines that the scrolling operation is over. In other words, the detection unit 145 detects, as the scrolling operation, a period since the web page W10 is selected (in this example, tapped) until the web page W10 becomes no longer selected (in this example, until finger F10 lets go of display surface of output unit 130).

Also, as illustrated in the second state and the third state in FIG. 7, when the scrolling operation is detected by the detection unit 145, the variation unit 146 varies the display mode of the advertisement content C10 until the detection unit 145 detects that the scrolling operation is over. Then, as illustrated in the fourth state in FIG. 7, when the detection unit 145 detects that the web page W10 is no longer selected, the variation unit 146 restores the display mode of the advertisement content C10 to the first state.

That is, when the web page W10 is kept selected after the scrolling operation, the terminal apparatus 100 displays the advertisement content C10 in an emphasized manner. Thus, the terminal apparatus 100 can improve advertisement effect of the advertisement content C10. For example, some of the users may realize that there is the advertisement content C10 by scrolling the web page W10. In this case, some of the users may want the advertisement content C10 to be kept displayed in an emphasized manner. Since the terminal apparatus 100 according to the embodiment displays the advertisement content C10 in an emphasized manner when the web page W10 is kept selected, it is possible to give more chances for a user to browse the advertisement content C10. As a result, the terminal apparatus 100 can improve advertisement effect of the advertisement content C10.

6-2. Second Different Display Example

Then, an example in FIG. 8 will be described. A first state in FIG. 8 is similar to the first state in FIG. 7. Here, as illustrated in a second state in FIG. 8, it is assumed that a user has scrolled the web page W10 by a flick operation. Specifically, it is assumed that after selecting the web page W10, the user has performed an operation to move the web page W10 quickly in a predetermined direction (upper direction in example in FIG. 8). In this case, as illustrated in a third state in FIG. 8, a general terminal apparatus 100 which employs a touch panel makes the web page W10 scroll for a predetermined distance (called inertial scrolling or the like) even after the finger F10 lets go of the web page W10. For example, the terminal apparatus 100 makes the web page W10 scroll automatically for a distance corresponding to a speed in which a user moves a display surface.

As illustrated in the third state in FIG. 8, the terminal apparatus 100 according to the embodiment also keeps the display mode of the advertisement content C10 varied during the inertial scrolling. Then, as illustrated in a fourth state in FIG. 8, when the movement of the web page W10 stops, the terminal apparatus 100 restores the display mode of the advertisement content C10 to the first state.

Specifically, when detecting the scrolling operation on the web page W10, the detection unit 145 of the terminal apparatus 100 detects whether the web page W10 is moving. Then, when detecting that the web page W10 has stopped, the detection unit 145 determines that the scrolling operation is over. In other words, the detection unit 145 detects, as the scrolling operation, a period since the web page W10 starts moving until the web page W10 stops.

Also, as illustrated in the second state and the third state in FIG. 8, when the scrolling operation is detected by the detection unit 145, the variation unit 146 varies the display mode of the advertisement content C10 until the detection unit 145 detects that the web page W10 has stopped. Then, as illustrated in the fourth state in FIG. 8, when the detection unit 145 detects that the web page W10 has stopped, the variation unit 146 restores the display mode of the advertisement content C10 to the first state.

In such a manner, the terminal apparatus 100 displays the advertisement content C10 in an emphasized manner when the web page W10 keeps moving. Thus, the terminal apparatus 100 can improve advertisement effect of the advertisement content C10. For example, some of the users may realize that there is the advertisement content C10 by scrolling the web page W10. In this case, some of the users may want the advertisement content C10 to be kept displayed in an emphasized manner. When a user performs inertial scrolling of the web page W10, the terminal apparatus 100 according to the embodiment displays the advertisement content C10 in an emphasized manner. Thus, it is possible to give more chances for the user to browse the advertisement content C10. As a result, the terminal apparatus 100 can improve advertisement effect of the advertisement content C10.

Note that the terminal apparatus 100 according to the embodiment may perform both of the display processing illustrated in FIG. 7 and the display processing illustrated in FIG. 8. In this case, when the web page W10 is kept selected after the scrolling operation, the terminal apparatus 100 keeps the display mode of the advertisement content C10 varied regardless of whether the web page W10 is moving or not.

7. Processing Flow of Advertisement Distribution System

Figure 9:
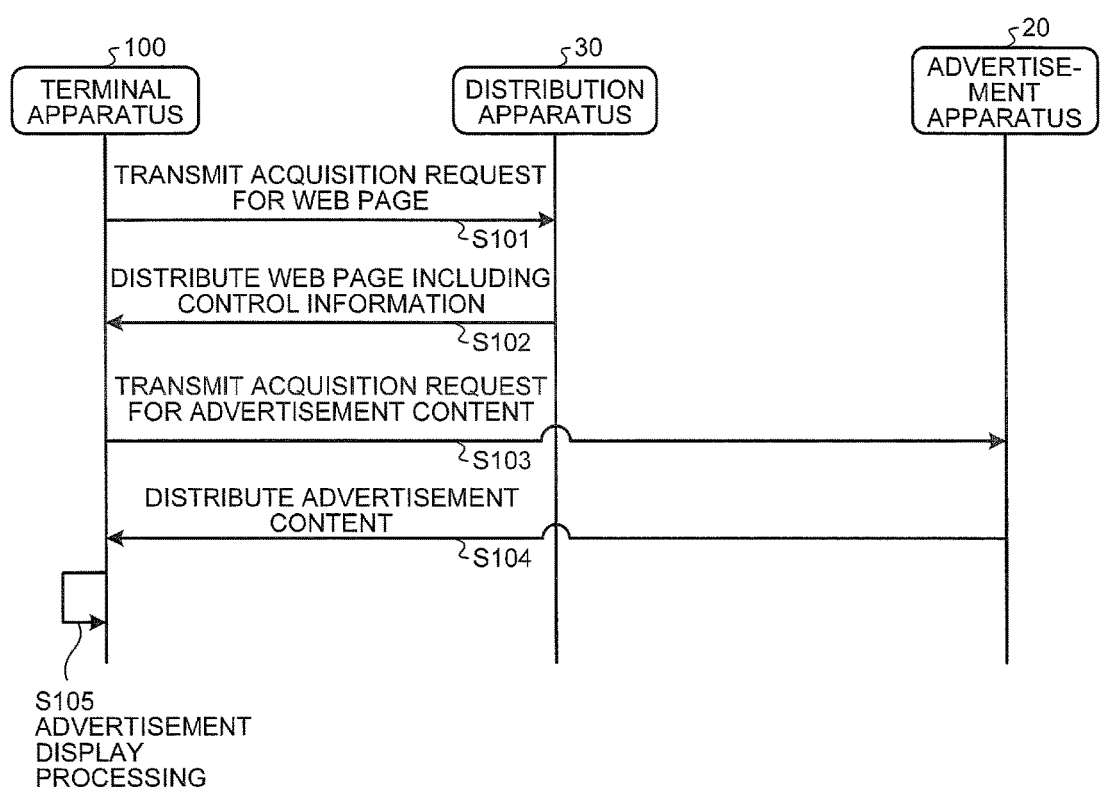
FIG. 9 is a sequence diagram illustrating a distribution processing step by the advertisement distribution system according to the embodiment.

Next, with reference to FIG. 9, a step of distribution processing by the advertisement distribution system 1 according to the embodiment will be described. FIG. 9 is a sequence diagram illustrating the distribution processing step by the advertisement distribution system 1 according to the embodiment.

As illustrated in FIG. 9, according to a user operation, the terminal apparatus 100 transmits an acquisition request for a web page to the distribution apparatus 30 (step S101). Then, in response to the acquisition request for a web page, the distribution apparatus 30 distributes, to the terminal apparatus 100, a web page including control information (step S102). Note that the web page distributed by the distribution apparatus 30 includes an advertisement acquisition instruction such as a URL or the like of the advertisement apparatus 20.

Then, based on the advertisement acquisition instruction included in the web page, the terminal apparatus 100 transmits an acquisition request for advertisement content to the advertisement apparatus 20 (step S103). Then, in response to the acquisition request for advertisement content, the advertisement apparatus 20 distributes advertisement content to the terminal apparatus 100 (step S104).

Then, according to the control information included in the web page received in step S102, the terminal apparatus 100 performs display processing to display the web page and the advertisement content received in step S104 (step S105).

8. Processing Flow of Terminal Apparatus

Figure 10:
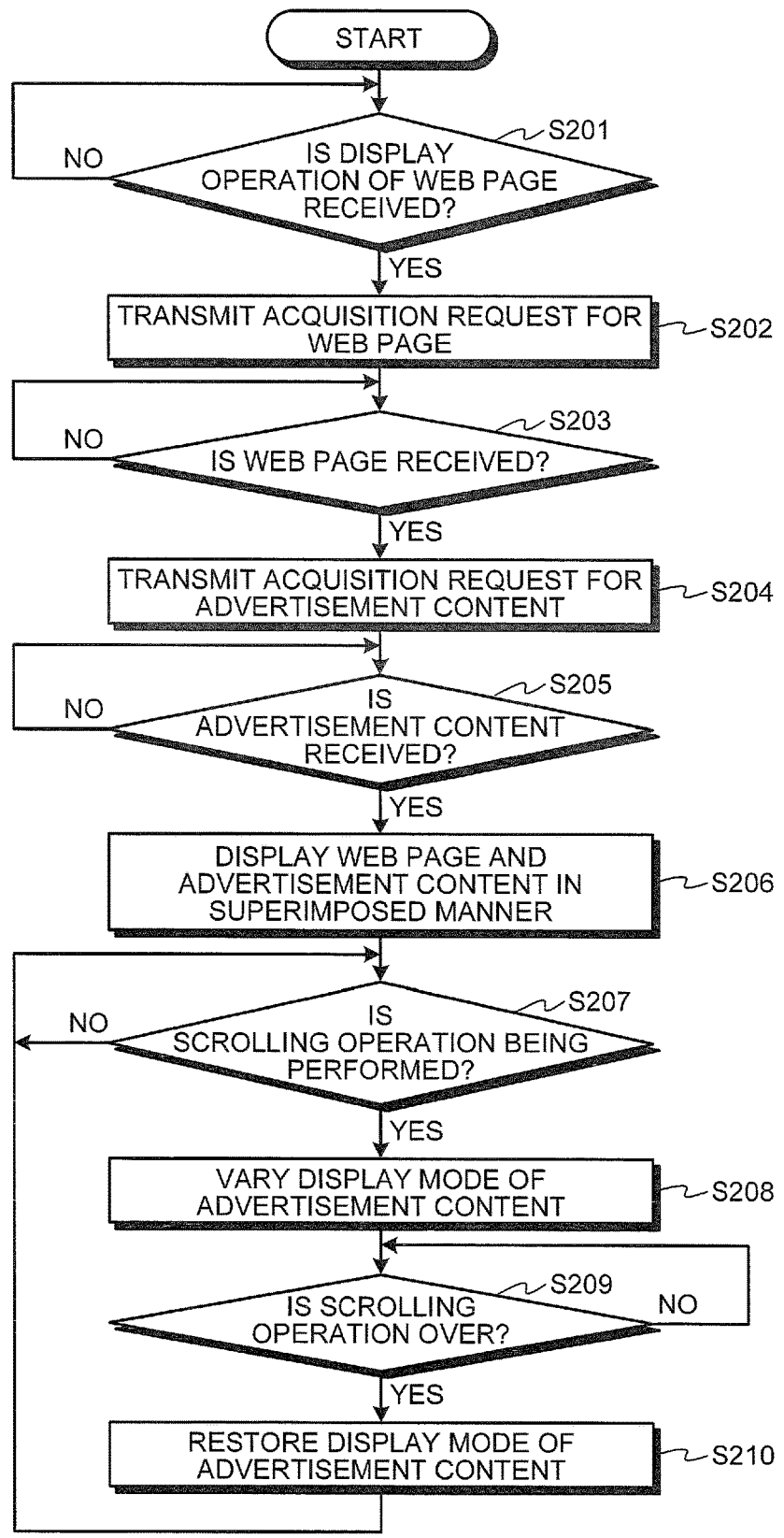
FIG. 10 is a flowchart illustrating a processing step by the terminal apparatus according to the embodiment.

Next, with reference to FIG. 10, a step of processing by the terminal apparatus 100 according to the embodiment will be described. FIG. 10 is a flowchart illustrating a processing step by the terminal apparatus 100 according to the embodiment.

As illustrated in FIG. 10, the terminal apparatus 100 determines whether a display operation of a web page is received from a user (step S201). Here, when the display operation is not received (step S201; No), the terminal apparatus 100 waits until the display operation is received.

On the other hand, when the display operation is received (step S201; Yes), the terminal apparatus 100 transmits an acquisition request for a web page to the distribution apparatus 30 (step S202). Then, the terminal apparatus 100 determines whether a web page is received from the distribution apparatus 30 (step S203). Here, when the web page is not received (step S203; No), the terminal apparatus 100 waits until the web page is received.

On the other hand, when the web page is received from the distribution apparatus 30 (step S203; Yes), the terminal apparatus 100 transmits an acquisition request for advertisement content to the advertisement apparatus 20 according to an advertisement acquisition request included in the web page (step S204). Then, the terminal apparatus 100 determines whether advertisement content is received from the advertisement apparatus 20 (step S205). Here, when the advertisement content is not received (step S205; No), the terminal apparatus 100 waits until the advertisement content is received.

On the other hand, when the advertisement content is received from the advertisement apparatus 20 (step S205; Yes), the terminal apparatus 100 displays the web page and the advertisement content in a superimposed manner (step S206). For example, the terminal apparatus 100 displays the advertisement content in the first transparency in such a manner that the web page is superimposed thereon.

Then, the terminal apparatus 100 determines whether a scrolling operation to move the web page is performed (step S207). Here, when the scrolling operation is not performed (step S207; No), the terminal apparatus 100 waits until the scrolling operation is performed.

On the other hand, when the scrolling operation is performed (step S207; Yes), the terminal apparatus 100 varies a display mode of the advertisement content displayed in step S206 (step S208). For example, the terminal apparatus 100 varies the transparency of the advertisement content from the first transparency to the second transparency.

Also, the terminal apparatus 100 determines whether the scrolling operation is over (step S209). Here, when the scrolling operation is not over (step S209; No), the terminal apparatus 100 waits in a state in which the display mode of the advertisement content is kept varied.

On the other hand, when the scrolling operation is over (step S209; Yes), the terminal apparatus 100 restores the display mode of the advertisement content (step S210). Specifically, the terminal apparatus 100 displays the advertisement content in the display mode displayed in step S206. Then, the terminal apparatus 100 repeats the processing steps in step S207 to step S210.

9. Modification

The advertisement distribution system 1 according to the described embodiment may be performed in various different embodiments other than the embodiment. Thus, in the following, different embodiments of the advertisement distribution system 1 will be described. Note that a terminal apparatus 100 described in the following performs display processing of advertisement content according to control information included in a web page.

9-1. Related Content

The above-described terminal apparatus 100 may display not only advertisement content but also related content which is related to the advertisement content. Then, when a scrolling operation is performed, the terminal apparatus 100 may vary a display mode of the related content similarly to that of the advertisement content. This point will be described with reference to FIG. 11.

Figure 11:
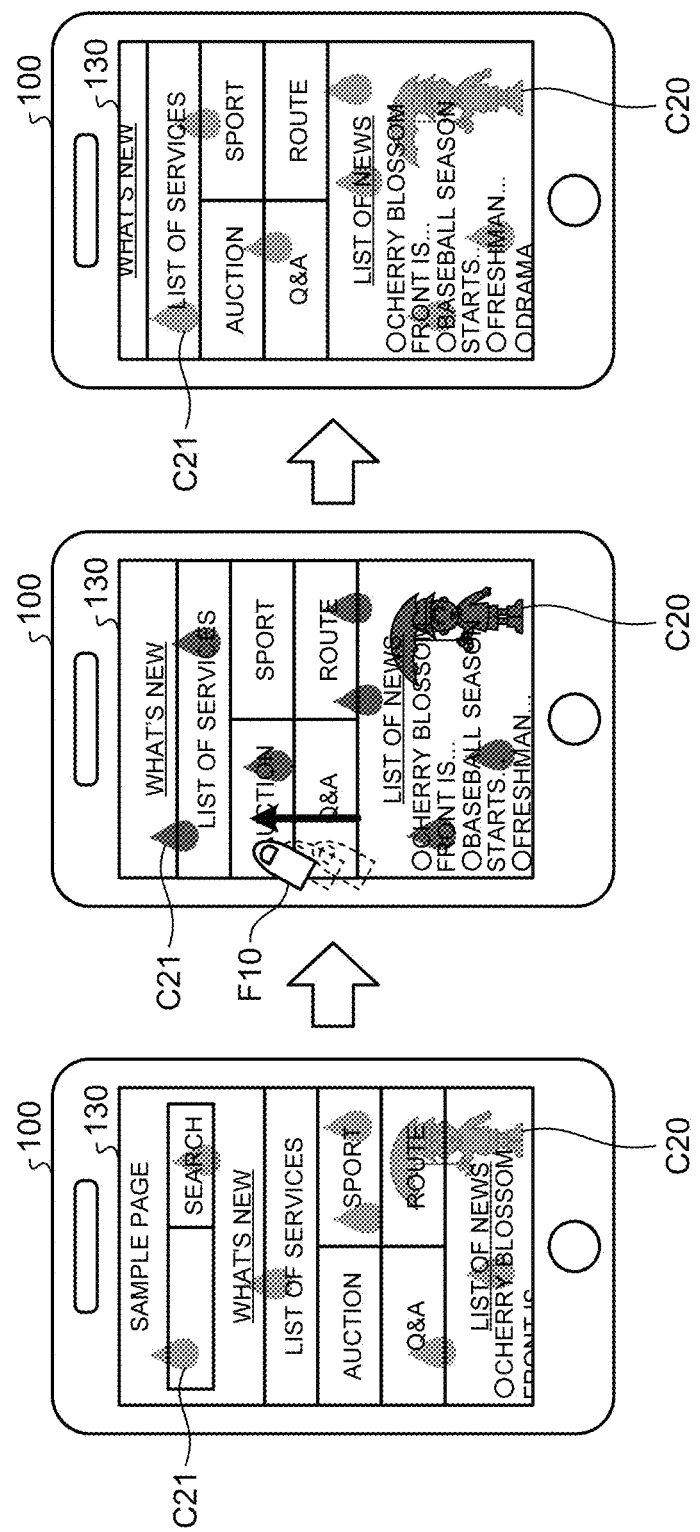
FIG. 11 is a view illustrating an example of display processing according to a modification.

FIG. 11 is a view illustrating an example of display processing according to a modification. Advertisement content C20 illustrated in FIG. 11 illustrates, for example, a logo of a company which sells an umbrella, or the like. Also, related content C21 is content related to the advertisement content C20. For example, the related content C21 is a static image or a dynamic image illustrating rain which is related to an umbrella. Note that in FIG. 11, a reference sign "C21" is assigned to a part of the related content, but all pieces of content illustrating rain correspond to the related content C21.

In a case of an example illustrated in a first state in FIG. 11, a display unit 144 of a terminal apparatus 100 displays the advertisement content C20 and a web page W10 in a superimposed manner similarly to the above-described advertisement content C10. Also, the display unit 144 displays the related content C21 and the web page W10 in a superimposed manner. For example, the display unit 144 displays the advertisement content C20 and the related content C21 in first transparency.

Then, as illustrated in a second state in FIG. 11, when a scrolling operation is detected by a detection unit 145, a variation unit 146 varies display modes of both of the advertisement content C20 and the related content C21. For example, the display unit 144 varies the transparency of the advertisement content C20 and the related content C21 to second transparency.

Also, as illustrated in a third state in FIG. 11, when the scrolling operation is no longer detected by the detection unit 145, the variation unit 146 restores the display mode of each of the advertisement content C20 and the related content C21 to the former first state. For example, the display unit 144 varies the transparency of the advertisement content C20 and the related content C21 to the first transparency.

In such a manner, the terminal apparatus 100 may display not only the advertisement content C20 but also the related content C21 related to the advertisement content C20 in such a manner that the web page W10 is superimposed thereon. Then, the terminal apparatus 100 may vary the display modes of both of the advertisement content C20 and the related content C21 during the scrolling operation. Thus, since the terminal apparatus 100 can emphasize the advertisement content C20 by the related content C21, advertisement effect of the advertisement content C20 can be improved.

Note that in an example illustrated in FIG. 11, it is not necessary for the variation unit 146 to vary the display mode of the related content C21 even when the scrolling operation is performed. That is, in the second state in FIG. 11, although the variation unit 146 varies the display mode of the advertisement content C20, the display mode of the related content C21 may be kept as a display mode similar to that of the first state.

Also, in the example illustrated in FIG. 11, the related content C21 may be submitted by an advertiser such as the company to sell an umbrella or may be prepared by an administrator or the like of a distribution apparatus 30 or an advertisement apparatus 20. In this case, the advertisement apparatus 20 stores the related content by associating the related content with a keyword indicating a characteristic or the like of the advertisement content. Then, when distributing the advertisement content C20 to the terminal apparatus 100, the advertisement apparatus 20 also distributes, to the terminal apparatus 100, the related content C21 corresponding to a keyword of the advertisement content C20.

9-2. Switching Advertisement Content

Also, when a web page is scrolled to a predetermined position, the above-described terminal apparatus 100 may vary advertisement content to different advertisement content. In other words, when a predetermined area of the web page is displayed on an output unit 130, the terminal apparatus 100 may hide the advertisement content and may newly display advertisement content different from the advertisement content. This point will be described with reference to FIG. 12.

Figure 12:
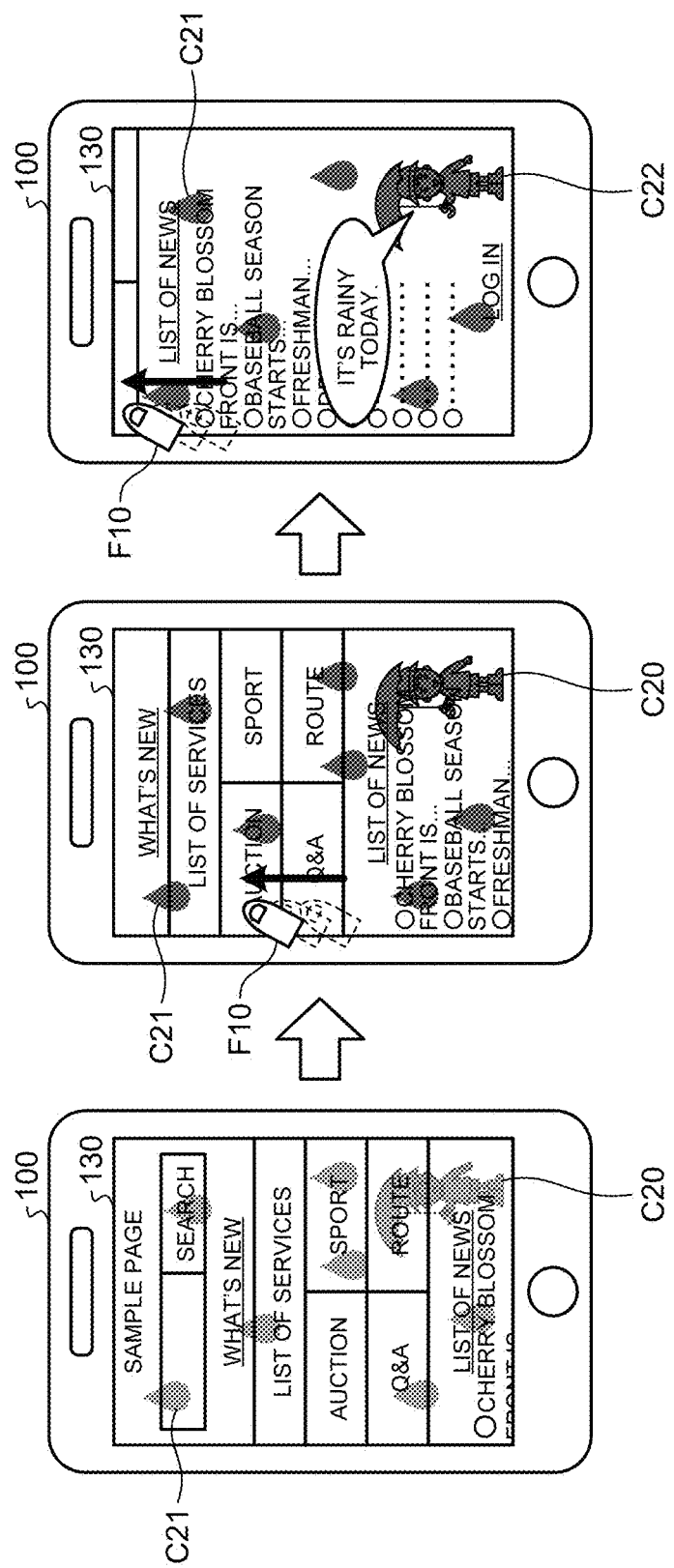
FIG. 12 is a view illustrating an example of the display processing according to the modification.

FIG. 12 is a view illustrating an example of the display processing according to the modification. In FIG. 12, an example in which advertisement content is switched when an end of the web page is displayed on the output unit 130 will be described. A first state in FIG. 12 is similar to the first state in FIG. 11. Also, a second state in FIG. 12 is similar to the second state of FIG. 11.

Here, as illustrated in a third state in FIG. 12, it is assumed that a user has performed a scrolling operation until the end of the web page W10 is displayed. In this case, the terminal apparatus 100 switches from the advertisement content C20 and displays new advertisement content C22. In an example in FIG. 12, it is assumed that the advertisement content C22 is a static image in which a balloon is added to the advertisement content C20. Also, in the example in FIG. 12, it is assumed that the terminal apparatus 100 displays the advertisement content C22 to the front of the web page W10 in such a manner that the web page W10 cannot be seen therethrough. However, the terminal apparatus 100 may display the advertisement content C22 in a display mode in which the web page W10 can be seen therethrough.

Specifically, the detection unit 145 detects whether the web page W10 is moved to the end by the scrolling operation. In other words, the detection unit 145 detects whether the end of the web page W10 is displayed on the output unit 130. Then, as illustrated in the third state in FIG. 12, when the detection unit 145 detects that the end of the web page W10 is displayed, the variation unit 146 hides the advertisement content C20 and newly displays the advertisement content C22. That is, when the end of the web page W10 is displayed by the scrolling operation, the variation unit 146 switches from the advertisement content C20 and displays the advertisement content C22.

Then, when the web page W10 is kept selected (that is, until finger F10 lets go of display surface of output unit 130), the variation unit 146 keeps displaying the advertisement content C22. Then, when the web page W10 is no longer selected, the variation unit 146 switches from the advertisement content C22 and displays the advertisement content C20. However, when the end of the web page W10 is displayed, the variation unit 146 may keep displaying the advertisement content C22 regardless of whether the web page W10 is selected or not.

Also, when the end of the web page W10 is no longer displayed due to the scrolling operation being performed again after the third state in FIG. 12, the variation unit 146 switches from the advertisement content C22 and displays the advertisement content C20.

In such a manner, when the web page W10 is scrolled to a predetermined position, the terminal apparatus 100 switches from the advertisement content C20 to different advertisement content C22. Thus, it is possible to make a user focus on the advertisement content C20 and C22. As a result, the terminal apparatus 100 can improve advertisement effect of the advertisement content C20 and C22. Also, in a case of the example in FIG. 12, when the end of the web page W10 is displayed, the terminal apparatus 100 switches from the advertisement content C20 to the advertisement content C22. Thus, it is possible to encourage a user to browse the web page W10 to the end.

Note that in the above example, it is assumed that the variation unit 146 switches from the advertisement content C20 and displays the advertisement content C22. However, in the third state in FIG. 12, the variation unit 146 may keep displaying the advertisement content C20 and newly display advertisement content corresponding to the balloon.

Also, in the example in FIG. 12, the variation unit 146 may display the advertisement content C22 related to terminal information about the terminal apparatus 100. As an example of the terminal information, there is a current location of the terminal apparatus 100, current time, or the like. In a case of the example in FIG. 12, the variation unit 146 displays the advertisement content C22 indicating the weather at a current location of the terminal apparatus 100. For example, when it is rainy at the current location of the terminal apparatus 100, the variation unit 146 displays the advertisement content C22 indicating rain as illustrated in the example in FIG. 12. Note that as described above, the advertisement content C22 displayed on the terminal apparatus 100 is distributed by the advertisement apparatus 20. Thus, when receiving an acquisition request for advertisement content from the terminal apparatus 100, the advertisement apparatus 20 also receives terminal information (such as current location) about the terminal apparatus 100. Then, the advertisement apparatus 20 distributes, to the terminal apparatus 100, the advertisement content C22 corresponding to the terminal information received from the terminal apparatus 100.

Also, in the example in FIG. 12, a link to an advertiser page may be provided to the advertisement content C22. In this case, since the variation unit 146 displays the advertisement content C22 to the front of the web page W10, the advertisement content C22 can be displayed in a clickable state.

Also, in a case of the example in FIG. 12, the advertisement apparatus 20 distributes the advertisement content C20, C21, and C22 to the terminal apparatus 100. Then, according to control information, the terminal apparatus 100 controls display modes of the advertisement content C20, C21, and C22.

9-3. Moving Advertisement Content

Also, when a scrolling operation is performed, the above-described terminal apparatus 100 may move advertisement content along with a movement of a web page. This point will be described with reference to FIG. 13.

Figure 13:
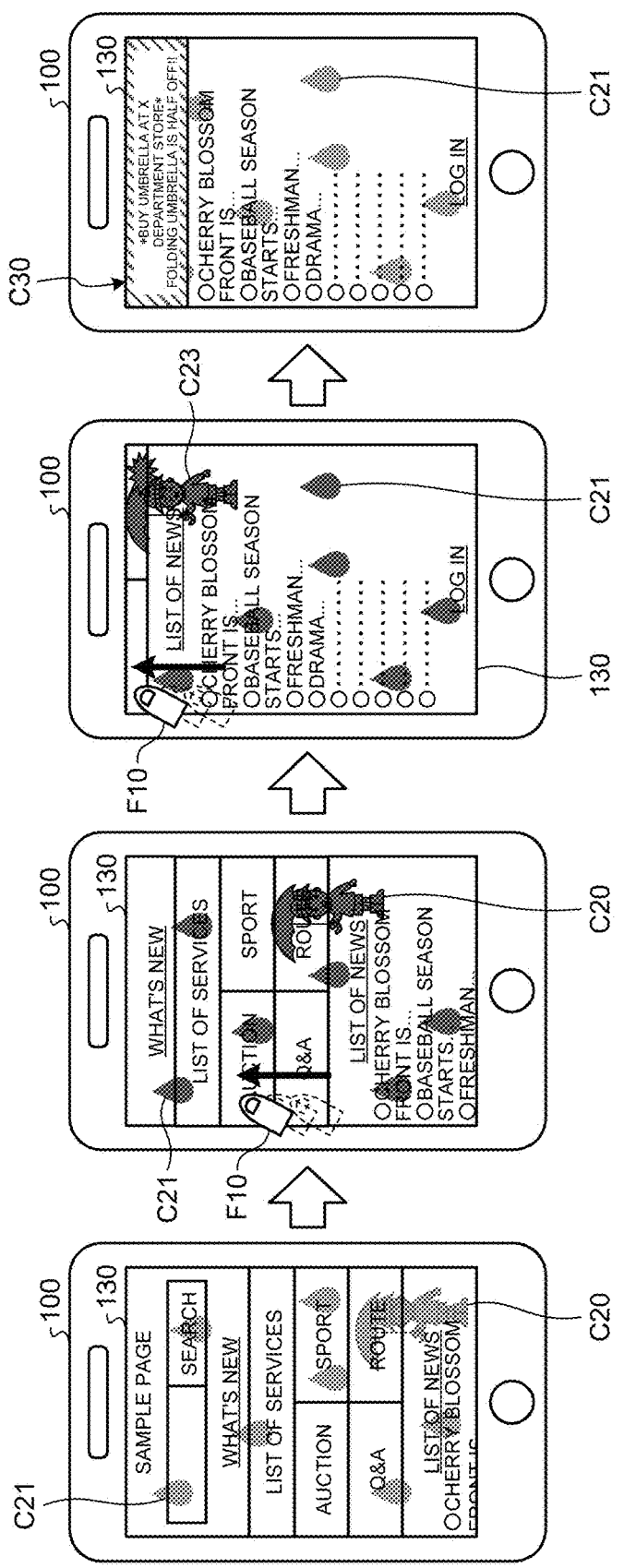
FIG. 13 is a view illustrating an example of the display processing according to the modification.

FIG. 13 is a view illustrating an example of the display processing according to the modification. A first state in FIG. 13 is similar to the first state in FIG. 11. Then, as illustrated in a second state in FIG. 13, when a scrolling operation is performed, the terminal apparatus 100 moves the advertisement content C20 along with the web page W10.

Specifically, when the detection unit 145 detects the scrolling operation, the variation unit 146 varies a display position of the advertisement content C20 along with the scrolling operation. Here, similarly to the above-described examples, while the scrolling operation is detected by the detection unit 145, the variation unit 146 varies the display mode of the advertisement content C20. For example, the variation unit 146 varies the transparency of the advertisement content C20 to the second transparency and varies the display position of the advertisement content C20.

Also, as illustrated in a third state in FIG. 13, when the display position of the advertisement content C20 reaches an upper end of the output unit 130 as a result of the movement of the advertisement content C20, the variation unit 146 hides the advertisement content C20 and newly displays advertisement content C23. In an example in FIG. 13, the variation unit 146 newly displays the advertisement content C23 which evokes a person hitting a ceiling, the person being indicated by the advertisement content C20. Note that the display processing by the terminal apparatus 100 illustrated in the third state in FIG. 13 is similar to the display processing illustrated in the third state in FIG. 12.

Then, when a predetermined period of time (such as a second or two seconds) has passed, as illustrated in a fourth state in FIG. 13, the variation unit 146 hides the advertisement content C23 and newly displays advertisement content C30. In the example in FIG. 13, the variation unit 146 displays the advertisement content C30 to the front of the web page W10. That is, the variation unit 146 displays the advertisement content C30 in such a manner that the web page W10 cannot be seen therethrough. Here, when a link to an advertiser page is provided to the advertisement content C30, the variation unit 146 displays the advertisement content C30 in a clickable state.

In such a manner, by moving the advertisement content C20 along with the web page W10, the terminal apparatus 100 can vary the display position of the advertisement content C20 in response to a user operation. As a result, the terminal apparatus 100 can make a user focus on the advertisement content C20. Thus, advertisement effect of the advertisement content C20 can be improved. Also, when the advertisement content C20 is moved to a predetermined position, the terminal apparatus 100 can vary advertisement content to be displayed in response to a user operation by switching from the advertisement content C20 to the advertisement content C23 and C30. As a result, the terminal apparatus 100 can make a user focus on the advertisement content C20, C23, and C30. Thus, advertisement effect can be improved.

Note that in a case of the example in FIG. 13, the advertisement apparatus 20 distributes the advertisement content C20, C21, C23, and C30 to the terminal apparatus 100. Then, the terminal apparatus 100 controls the display modes of the advertisement content C20, C21, C23, and C30 according to the control information.

9-4. Displaying Animation

Also, when a scrolling operation is performed, the above-described terminal apparatus 100 may vary a display mode of advertisement content dynamically. That is, when the scrolling operation is performed, the terminal apparatus 100 may display advertisement content such as an animation. This point will be described with reference to FIG. 14.

Figure 14:
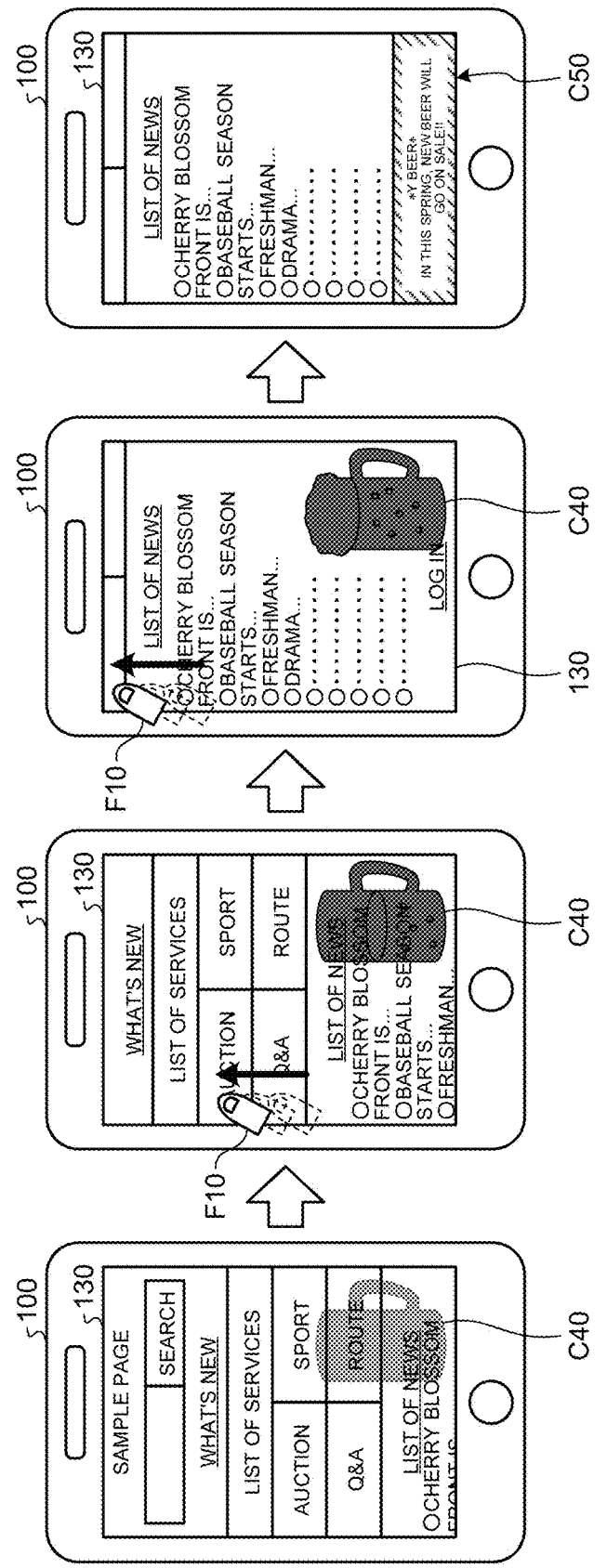
FIG. 14 is a view illustrating an example of the display processing according to the modification.

FIG. 14 is a view illustrating an example of the display processing according to the modification. As illustrated in a first state in FIG. 14, the display unit 144 of the terminal apparatus 100 displays the web page W10 and advertisement content C40 in a superimposed manner. For example, the display unit 144 displays the advertisement content C40 in the first transparency. Note that the advertisement content C40 illustrated in FIG. 14 is a static image of a beer glass and is submitted, for example, by a company which sells beer, or the like.

Then, as illustrated in a second state in FIG. 14, when a scrolling operation is performed, the variation unit 146 of the terminal apparatus 100 varies a display mode of the advertisement content C40 as if beer is poured into the beer glass indicated by the advertisement content C40. Specifically, while the scrolling operation is detected by the detection unit 145, the variation unit 146 gradually varies the display mode of the advertisement content C40 as if beer is gradually poured into the beer glass. Here, similarly to the above-described examples, the variation unit 146 keeps transparency of the advertisement content C40 as the second transparency while the scrolling operation is detected by the detection unit 145.

Then, as illustrated in a third state in FIG. 14, when the scrolling operation is detected by the detection unit 145 for equal to or longer than a predetermined period of time, the variation unit 146 eventually varies the display mode of the advertisement content C40 to a state in which the beer glass is full of beer.

Then, when a predetermined period of time (such as a second or two seconds) has passed, as illustrated in a fourth state in FIG. 14, the variation unit 146 hides the advertisement content C40 and newly displays advertisement content C50. In the example in FIG. 14, the variation unit 146 displays the advertisement content C50 to the front of the web page W10. That is, the variation unit 146 displays the advertisement content C50 in such a manner that the web page W10 cannot be seen through. Here, when a link to an advertiser page is provided to the advertisement content C50, the variation unit 146 displays the advertisement content C50 in a clickable state.

In such a manner, the terminal apparatus 100 varies the display mode of the advertisement content C40 dynamically while the scrolling operation is performed. Thus, it is possible to make a user focus on the advertisement content C40.

Note that when the scrolling operation ends after the display mode of the advertisement content C40 is dynamically varied to a predetermined state, the variation unit 146 may vary the transparency of the advertisement content C40 from a predetermined state to the first transparency. For example, when the scrolling operation ends in the second state in FIG. 14, the variation unit 146 may make the transparency of the advertisement content C40, which is illustrated in the second state in FIG. 14, into the first transparency. Then, following this, when the scrolling operation is detected again by the detection unit 145, the variation unit 146 may dynamically vary the display mode of the advertisement content C40 from a state illustrated in the second state. That is, the variation unit 146 may vary the display mode of the advertisement content C40 in such a manner that the animation progresses only while the scrolling operation is performed.

9-5. Content for Description

Also, in the above embodiment, an example in which advertisement content is displayed when a scrolling operation is performed is illustrated. However, when a scrolling operation is performed, the terminal apparatus 100 may superimpose and display content not for advertising on a web page. For example, the terminal apparatus 100 may superimpose and display content for describing a web page, content for emphasizing a web page, or the like on the web page. This point will be described with reference to FIG. 15.

Figure 15:
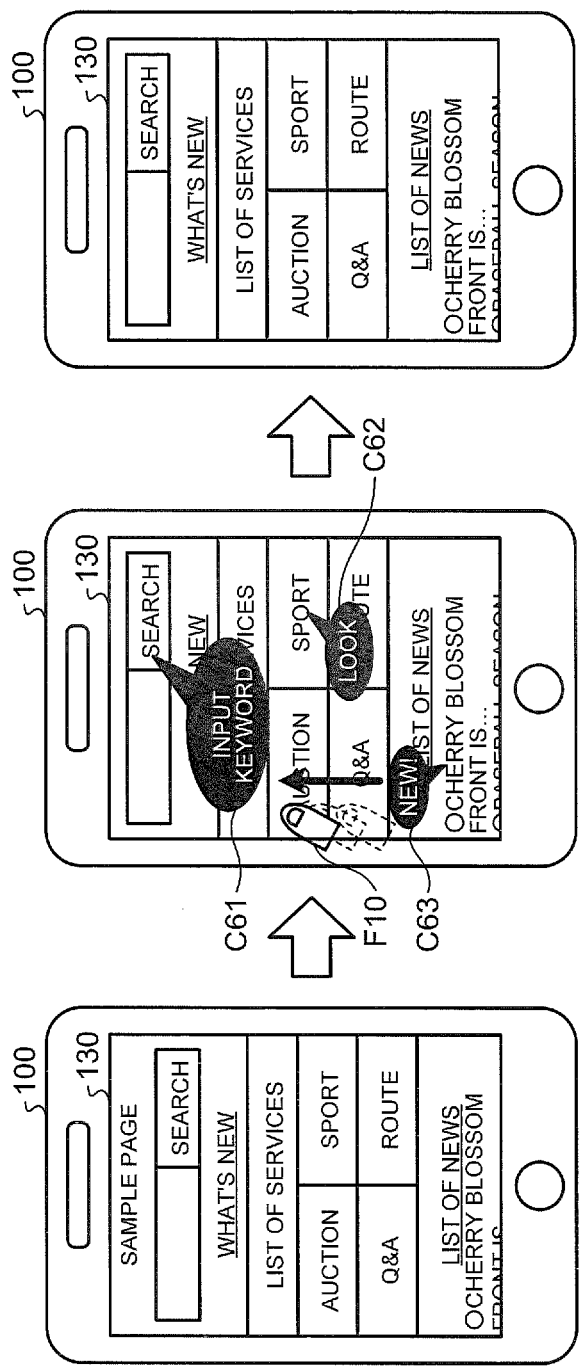
FIG. 15 is a view illustrating an example of the display processing according to the modification.

FIG. 15 is a view illustrating an example of the display processing according to the modification. As illustrated in a first state in FIG. 15, the display unit 144 of the terminal apparatus 100 displays the web page W10. Then, as illustrated in a second state in FIG. 15, when a scrolling operation is detected by the detection unit 145, the variation unit 146 superimposes and displays content C61 to C63 on the web page W10.

In an example in FIG. 15, the content C61 corresponds to content to describe an entry field included in the web page W10. Also, the content C62 corresponds to content to describe a button included in the web page W10. Also, the content C63 corresponds to content to describe an article posted on the web page W10.

Then, when the scrolling operation is no longer detected by the detection unit 145, as illustrated in a third state in FIG. 15, the variation unit 146 hides the content C61 to C63. That is, similarly to the first state, the variation unit 146 restores the state in which only the web page W10 is displayed.

Note that in the first state in FIG. 15, the display unit 144 displays the web page W10 and the content C61 to C63 in a superimposed manner. However, the display unit 144 displays the content C61 to C63 in a completely transparent state. Thus, in a case of the first state in FIG. 15, it is not possible for a user to visually recognize the content C61 to C63. Then, in the second state in FIG. 15, the variation unit 146 lowers the transparency of the content C61 to C63, whereby the content C61 to C63 is displayed in a visually recognizable state. Here, as illustrated in the second state in FIG. 15, the variation unit 146 may display the content C61 to C63 to the front of the web page W10. Then, in the third state in FIG. 15, the variation unit 146 increases the transparency of the content C61 to C63, whereby the content C61 to C63 is displayed in a transparent state which cannot be visually recognized.

In such a manner, while the scrolling operation is performed, the terminal apparatus 100 displays the content C61 to C63 to describe the web page W10. That is, during the scrolling operation in which it is not likely that a user is looking carefully at the web page W10, the terminal apparatus 100 displays the content C61 to C63 corresponding to a help function. Thus, the terminal apparatus 100 can improve usability in the web page W10. Also, since the terminal apparatus 100 can emphasize an article posted on the web page W10 by displaying the content C61 to C63, it is possible to make a user focus on the web page W10.

9-6. A Plurality of Advertisement Spaces

Also, the above-described terminal apparatus 100 may display a web page in which a plurality of advertisement spaces to display advertisement content is provided and may vary advertisement content displayed on each of the advertisement space. This point will be described with reference to FIG. 16.

Figure 16:
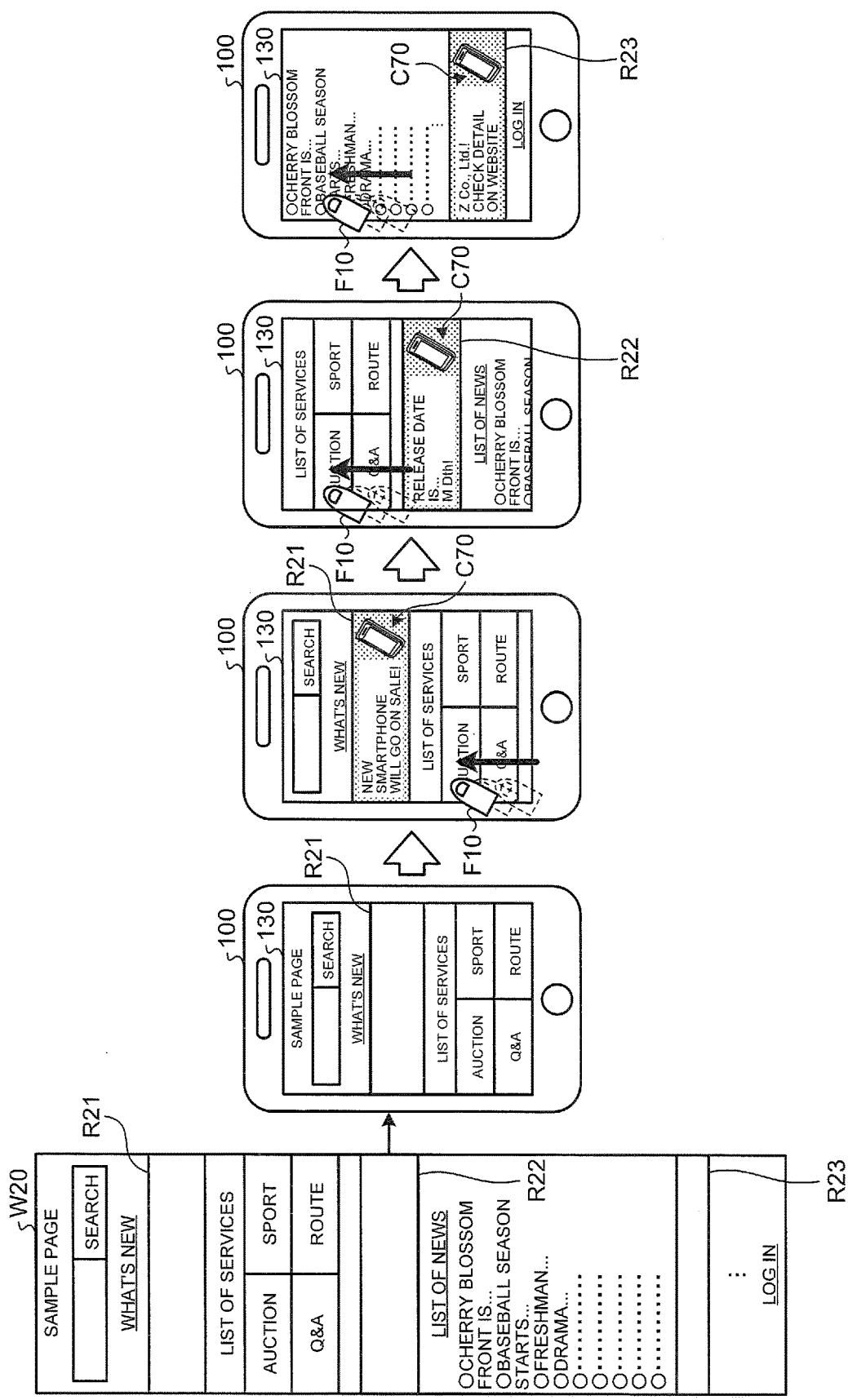
FIG. 16 is a view illustrating an example of the display processing according to the modification.

FIG. 16 is a view illustrating an example of the display processing according to the modification. A web page W20 illustrated in FIG. 16 includes advertisement display areas R21, R22, and R23 to display advertisement content. When displaying such a web page W20, each time an advertisement display area to be a display object is varied by a scrolling operation, the terminal apparatus 100 varies advertisement content displayed on the advertisement display area which is the display object.

Specifically, as illustrated in a first state in FIG. 16, the display unit 144 of the terminal apparatus 100 initially displays a head of the web page W20. Then, as illustrated in a second state in FIG. 16, it is assumed that the display unit 144 displays the advertisement display area R21 in response to a scrolling operation. In this case, the variation unit 146 displays advertisement content C70 on the advertisement display area R21. Specifically, the detection unit 145 detects whether the advertisement display areas R21, R22, and R23 are display objects. Note that, here, an advertisement display area of a display object indicates an advertisement display area displayed on a display area of the output unit 130. Then, in a case of a second state in FIG. 16, when it is detected, by the detection unit 145, that the advertisement display area R21 is the display object, the variation unit 146 displays the advertisement content C70 on the advertisement display area R21.

Then, as illustrated in a third state in FIG. 16, it is assumed that the display unit 144 displays the advertisement display area R22 in response to a scrolling operation. In this case, the detection unit 145 detects that the advertisement display area R22 is the display object. Then, the variation unit 146 displays the advertisement content C70 on the advertisement display area R22 detected by the detection unit 145. Here, the variation unit 146 displays the advertisement content C70 in a display mode which is different from that of the second state. In a case of the example in FIG. 16, in the second state, the variation unit 146 posts a sentence such as "New smartphone will go on sale! Release date is . . . " on the advertisement content C70. However, in the third state, the variation unit 146 posts a sentence such as "Release date is . . . M Dth!" on the advertisement content C70. Then, as illustrated in a fourth state in FIG. 16, when displaying the advertisement content C70 on the advertisement display area R23 which has become the display object, the variation unit 146 varies a display object of the advertisement content C70.

In such a manner, each time an advertisement display area to be the display object varies, the terminal apparatus 100 varies the display mode of the advertisement content C70 which is displayed on the advertisement display area which is currently the display object. Thus, since the terminal apparatus 100 can give narrativity to the advertisement content C70 displayed on the serially displayed advertisement display areas, it is possible to make a user focus on the advertisement content C70. As a result, the terminal apparatus 100 can improve advertisement effect of the advertisement content C70.

9-7. Continuous Operation

Also, the above-described terminal apparatus 100 may serially vary a display mode of advertisement content each time a scrolling operation is continuously performed in a predetermined period of time. Specifically, the variation unit 146 may gradually lower transparency of the above-described advertisement content each time a scrolling operation is continuously detected by the detection unit 145 in a predetermined period of time. In other words, the variation unit 146 may display the advertisement content in such a manner that the color thereof becomes gradually deeper each time the scrolling operation is continuously detected.

Then, after displaying the advertisement content while making the color thereof gradually deeper, when the number of times of continuous detection by the detection unit 145 becomes equal to or greater than the predetermined threshold number, the variation unit 146 may switch from the advertisement content to different advertisement content (such as advertisement content C30 illustrated in FIG. 13 or advertisement content C50 illustrated in FIG. 14).

Even when varying a display mode of advertisement content in such a manner, the terminal apparatus 100 can make a user focus on the advertisement content. Thus, advertisement effect of the advertisement content can be improved.

9-8. Variation Condition

Also, when a speed of scrolling is lower than a predetermined threshold speed, the above-described terminal apparatus 100 may not vary a display mode of advertisement content, and when a speed of scrolling is equal to or higher than the predetermined threshold speed, the above-described terminal apparatus 100 may vary the display mode of the advertisement content. Specifically, when detecting a scrolling operation, the detection unit 145 detects a speed of the scrolling operation. Alternatively, when detecting a scrolling operation, the detection unit 145 detects a speed of a web page which moves in response to the scrolling operation. Then, when the speed of scrolling detected by the detection unit 145 is equal to or higher than a threshold speed, the variation unit 146 varies a display mode of the advertisement content.

In such a manner, the terminal apparatus 100 varies a display mode of advertisement content based on a speed of scrolling, and thus, it is possible to prevent visibility of a web page from being lowered. Specifically, even when a user is performing a scrolling operation, in a case where a web page is scrolled slowly, the user may be carefully looking at an article or the like posted on the web page. Thus, the terminal apparatus 100 varies a display mode of advertisement content only when a speed of scrolling is equal to or higher than a threshold speed, whereby it is possible to prevent visibility of a web page for a user browsing the web page from being lowered. As a result, the terminal apparatus 100 can improve usability in the web page.

9-9. Calculating Charging Amount

Also, in the above embodiment, an example in which the calculation unit 28 of the advertisement apparatus 20 calculates a charging amount, which is charged to an advertiser as an advertisement distribution fee, based on the number of times advertisement content is displayed or clicked is illustrated. However, the calculation unit 28 may include a different element when calculating the charging amount to the advertiser. For example, the calculation unit 28 may calculate the charging amount based on the number of scrolls which is the number of times the scrolling operation is performed or a scrolling time which is a period of time the scrolling operation is performed. This point will be described with reference to FIG. 17.

Figure 17:
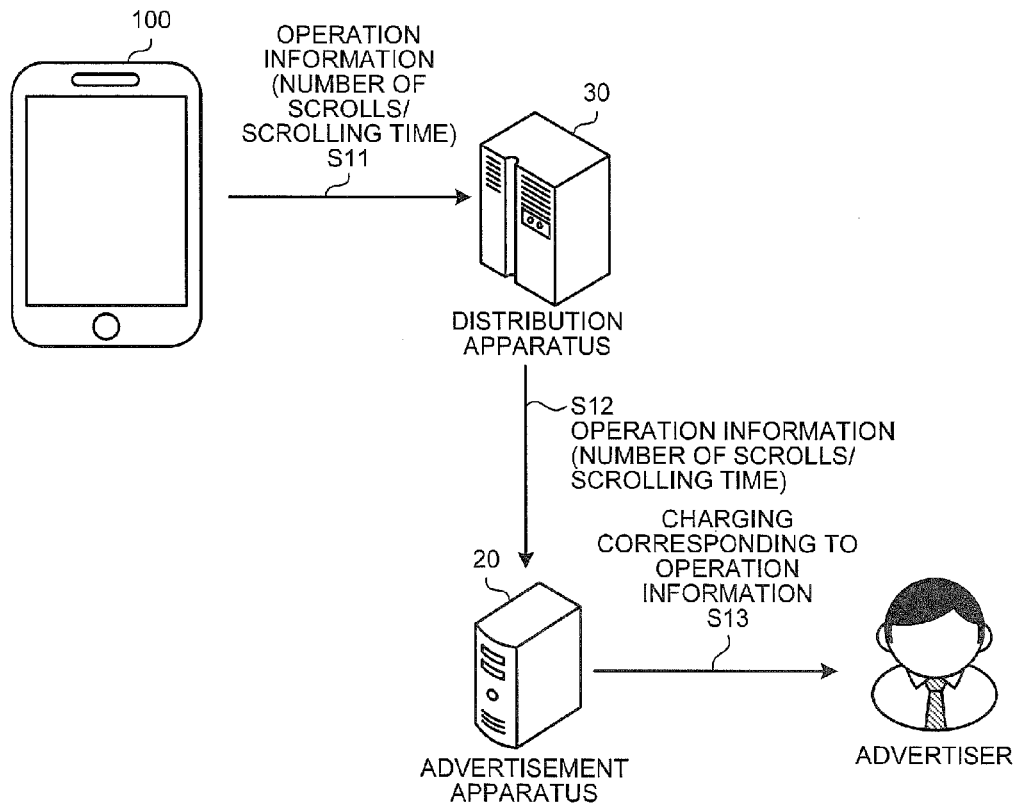
FIG. 17 is a view illustrating an example of calculation processing according to the modification.

FIG. 17 is a view illustrating an example of calculation processing according to the modification. As illustrated in FIG. 17, when a scrolling operation is performed by a user, the terminal apparatus 100 transmits, to the distribution apparatus 30, operation information including the number of scrolls or the scrolling time (step S11). Specifically, when detecting the scrolling operation, the detection unit 145 of the terminal apparatus 100 counts the number of scrolling operations of each piece of advertisement content displayed on a web page. Also, when detecting the scrolling operation, the detection unit 145 measures the scrolling time of each piece of advertisement content displayed on the web page. Then, the terminal apparatus 100 transmits, to the distribution apparatus 30, operation information including the number of scrolls or the scrolling time of each piece of advertisement content in each predetermined period of time (such as one month). The transmission processing may be performed by the detection unit 145 or may be performed by a transmission unit not illustrated in FIG. 6.

Then, as illustrated in FIG. 17, the distribution apparatus 30 transmits, to the advertisement apparatus 20, the operation information received from the terminal apparatus 100 (step S12). Then, a calculation unit 28 of the advertisement apparatus 20 calculates a charging amount to an advertiser based on the operation information received from the distribution apparatus 30 (step S13). For example, the greater the number of scrolls is, the greater number of times the advertisement content is displayed in an emphasized manner. Thus, the calculation unit 28 calculates the charging amount higher. Also, for example, the longer the scrolling time is, the longer period of time the advertisement content is displayed in an emphasized manner. Thus, the calculation unit 28 calculates the charging amount higher.

In such a manner, by using the number of scrolls or the scrolling time, the calculation unit 28 can calculate a fair charging amount which is directly linked to advertisement effect.

Also, not limited to the above example, the calculation unit 28 may calculate a charging amount to an advertiser based on an advertisement display ratio which is a ratio of a "period of time advertisement content is displayed in an emphasized manner" to a "period of time a web page is displayed". Specifically, the calculation unit 28 determines that the higher the advertisement display ratio is, the longer period of time the advertisement content is browsed by a user and calculates the charging amount higher. When this point is described, it is not likely that a user browsing an article or the like posted on a web page performs a scrolling operation for a long period of time. On the other hand, a user, who becomes interested in a display mode of the above-described advertisement content, is likely to perform a scrolling operation for a long period of time to make the advertisement content displayed in an emphasized manner. Thus, by calculating a charging amount in such a manner that the higher the advertisement display ratio is, the higher the charging amount becomes, the calculation unit 28 can calculate a fair charging amount which is directly liked to advertisement effect.

In such a manner, when the advertisement display ratio is used, the display unit 144 of the terminal apparatus 100 measures a period of time in which a web page is displayed on the output unit 130 by the display unit 144 (hereinafter, referred to as "page display time") and a period of time in which a display mode of advertisement content is varied by the variation unit 146 (hereinafter, referred to as "advertisement display time"). Here, the display unit 144 measures the page display time and the advertisement display time of each piece of advertisement content displayed on a web page. Then, the terminal apparatus 100 transmits, to the distribution apparatus 30, operation information including the page display time and the advertisement display time of each piece of advertisement content in a predetermined period of time (such as one month).

Note that in the above-described example, an example in which the advertisement apparatus 20 calculates a charging amount is illustrated. However, the distribution apparatus 30 may calculate the charging amount. In this case, the distribution apparatus 30 includes the calculation unit 28 illustrated in FIG. 3.

9-10. Display Mode

Also, a display mode of each of various kinds of content such as advertisement content, related content, and the like described above is not limited to an illustrated example. For example, the above-described advertisement content or the like may be displayed in a completely transparent state when a scrolling operation is not performed. Also, the above-described advertisement content or the like may be displayed, without transparency, to the front of a web page when a scrolling operation is performed.

9-11. Web Page

Also, in the above embodiment, an example in which content such as advertisement content, related content, or the like and a web page are displayed in a superimposed manner is illustrated. However, the advertisement content or the like is not limited to be superimposed and displayed on a web page. For example, the above-described advertisement content or the like may be displayed on a screen of a mobile game or the like.

Also, in the above embodiment, an example in which a web page is scrolled vertically is illustrated. However, this example is not a limitation. For example, the terminal apparatus 100 may display a web page which can be scrolled horizontally and may vary a display mode of advertisement content or the like when the web page is scrolled horizontally. For example, the terminal apparatus 100 may display a map page, which is a web page related to a map, and may display content to describe a shop or a building on the map when a scrolling operation to move the map page in an arbitrary direction is performed.

9-12. Moving Operation

Also, in the above embodiment, as a moving operation to move a web page, a scrolling operation is described as an example. However, the moving operation is not limited to this example. For example, the moving operation to move a web page may be a reduction operation (such as pinch-in operation) to reduce and display a web page or an enlargement operation (such as pinch-out operation) to enlarge and display a web page. Also, a movement object may not be a web page. For example, the above-described embodiment can also be applied to a moving operation which moves predetermined content (such as icon or screen) on a desktop screen or a display screen of an application by a drag-and-drop operation or a scrolling operation.

9-13. Submitting Advertisement Content

Also, in the above embodiment, the submission reception unit 24 of the advertisement apparatus 20 may let an advertiser select a display mode of advertisement content. Specifically, the submission reception unit 24 may let an advertiser select an intended display mode among a part or all of the display modes of advertisement content exemplified in FIG. 1, FIG. 11, FIG. 12, FIG. 13, FIG. 14, FIG. 15, and FIG. 16. Here, the submission reception unit 24 makes the advertiser submit advertisement content necessary for the selected display mode.

9-14. Configuration of Apparatus

Also, in the above embodiment, an example in which the advertisement distribution system 1 includes the advertisement apparatus 20 and the distribution apparatus 30 has been illustrated. However, the advertisement apparatus 20 and the distribution apparatus 30 may be formed as one apparatus. In this case, the distribution apparatus 30 illustrated in FIG. 5 includes, for example, the advertisement content storage unit 22, the submission reception unit 24, and the extraction unit 26 which are illustrated in FIG. 3. Then, when receiving an acquisition request for a web page from the terminal apparatus 100, the distribution apparatus 30 distributes, to the terminal apparatus 100, advertisement content extracted from the advertisement content storage unit 22 and a web page not including an advertisement acquisition instruction.

Also, in the above embodiment, an example in which advertisement content is distributed to the terminal apparatus 100 from the advertisement apparatus 20 is illustrated. However, the distribution apparatus 30 may acquire the advertisement content from the advertisement apparatus 20. In this case, the request reception unit 25 of the advertisement apparatus 20 receives an acquisition request for advertisement content from the distribution apparatus 30. Also, the distribution unit 27 of the advertisement apparatus 20 distributes advertisement content to the distribution apparatus 30. Also, the distribution unit 35 of the distribution apparatus 30 distributes, to the terminal apparatus 100, the advertisement content acquired from the advertisement apparatus 20 and a web page not including an advertisement acquisition instruction.

9-15. Other

Also, among the processing described in the above embodiment, all or a part of processing described to be performed automatically can be performed manually and all or a part of processing described to be performed manually can be performed automatically by a known method. In addition to this, a processing step, a specific name, and information including various kinds of data or parameters which are illustrated in the above document or in the drawings, can be arbitrarily changed unless being mentioned specially. For example, various kinds of information illustrated in each figure are not limited to the illustrated information.

Also, each configuration element of each illustrated apparatus is functionally conceptual and is not necessarily configured physically in an illustrated manner. That is, a specific form of separation/combination of each apparatus is not limited to what is illustrated in the drawing, and it is possible to configure all or a part thereof by separating/combining functionally or physically in an arbitrary unit according to various loads or usage conditions. For example, the request unit 141 and the reception unit 142 illustrated in FIG. 6 may be combined.

Also, the embodiments described above can be arbitrarily combined within a scope in which contents of processing do not become inconsistent.

9-16. Hardware Configuration

Figure 18:
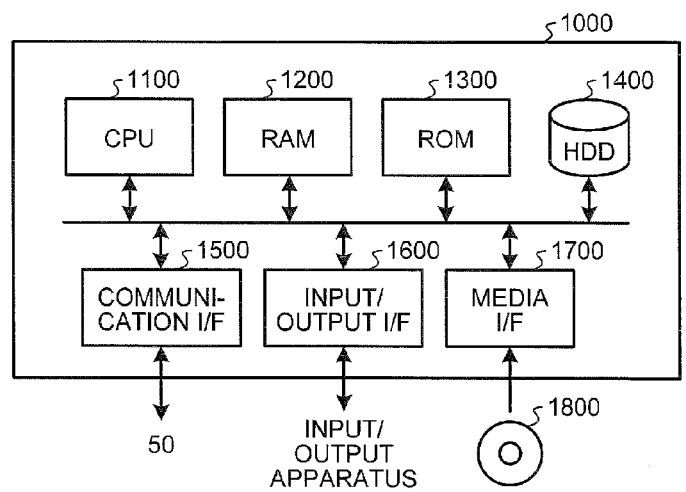
FIG. 18 is a hardware configuration view illustrating an example of a computer which realizes a function of the distribution apparatus.

Also, the terminal apparatus 100, the advertisement apparatus 20, and the distribution apparatus 30 according to the above-described embodiment are realized, for example, by a computer 1000 including a configuration illustrated in FIG. 18. In the following, description will be made with the distribution apparatus 30 as an example. FIG. 18 is a hardware configuration view illustrating an example of the computer 1000 which realizes a function of the distribution apparatus 30. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400 and controls each unit. The ROM 1300 stores a boot program executed by the CPU 1100 during activation of the computer 1000, a program which depends on hardware of the computer 1000, or the like.

The HDD 1400 stores a program executed by the CPU 1100 and data or the like used by the program. The communication interface 1500 receives data from a different device through a communication network 50 (corresponding to network N illustrated in FIG. 2), transmits the received data to the CPU 1100, and transmits data generated by the CPU 1100 to a different device through the communication network 50.

The CPU 1100 controls, through the input/output interface 1600, an output apparatus such as a display or a printer and an input apparatus such as a keyboard or a mouse. The CPU 1100 acquires data from the input apparatus through the input/output interface 1600. Also, the CPU 1100 outputs generated data to the output apparatus through the input/output interface 1600.

The media interface 1700 reads a program or data stored in a recording medium 1800 and provides the read program or data to the CPU 1100 through the RAM 1200. The CPU 1100 loads the program from the recording medium 1800 into the RAM 1200 through the media interface 1700 and executes the loaded program. The recording medium 1800 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the distribution apparatus 30 according to the embodiment, the CPU 1100 of the computer 1000 realizes a function of the control unit 33 by executing a program loaded into the RAM 1200. Also, to the HDD 1400, data in the content storage unit 32 is stored. The CPU 1100 of the computer 1000 executes these programs by reading the programs from the recording medium 1800. However, as a different example, these programs may be acquired from a different apparatus through the communication network 50.

Note that when the computer 1000 functions as the terminal apparatus 100 according to the embodiment, the CPU 1100 of the computer 1000 realizes a function of the control unit 140 by executing a program loaded into the RAM 1200.

Note that when the computer 1000 functions as the advertisement apparatus 20 according to the embodiment, the CPU 1100 of the computer 1000 realizes a function of the control unit 23 by executing a program loaded into the RAM 1200.

10. Effect

As described above, the distribution apparatus 30 according to the embodiment includes the distribution unit 35. The distribution unit 35 distributes control information and a web page (example of first content) to the terminal apparatus 100. Also, the control information makes the terminal apparatus 100 execute displaying by a display step, detecting by a detection step, and varying by a variation step. The display step displays the web page and advertisement content (example of second content) in a superimposed manner. In other word, the display step superposably displays the web page and advertisement content. The detection step detects a scrolling operation (example of moving operation) to move the web page displayed in the display step. The variation step varies a display mode of the advertisement content when the scrolling operation is detected in the detection step.

Thus, the distribution apparatus 30 according to the embodiment can prevent visibility of the web page and the advertisement content from being lowered and can improve advertisement effect of the advertisement content.

Also, in the display step in the distribution apparatus 30 according to the embodiment, the advertisement content is displayed in a translucent state in such a manner that the advertisement content has higher transparency than the web page. Also, in the variation step, when the scrolling operation is detected in the detection step, the advertisement content is displayed in a state in which the advertisement content has lower transparency than that in the translucent state.

Also, in the display step in the distribution apparatus 30 according to the embodiment, the advertisement content is displayed in a transparent state. Also, in the variation step, when the scrolling operation is detected in the detection step, the advertisement content is displayed in a state in which the advertisement content has higher transparency than the web page.

Also, in the variation step in the distribution apparatus 30 according to the embodiment, when the scrolling operation is detected in the detection step, the display mode of the advertisement content is dynamically varied.

Also, in the variation step in the distribution apparatus 30 according to the embodiment, when the scrolling operation is detected again in the detection step after the display mode of the advertisement content is dynamically varied to a predetermined state, the display mode of the advertisement content is dynamically varied from the predetermined state.

Also, in the detection step in the distribution apparatus 30 according to the embodiment, it is detected whether a predetermined area of the web page is displayed in response to the scrolling operation. Also, in the variation step, when it is detected that the predetermined area of the web page is displayed, the advertisement content is switched to different content.

Also, in the variation step in the distribution apparatus 30 according to the embodiment, as the different content, content related to the web page or the advertisement content is displayed.

Also, in the variation step in the distribution apparatus 30 according to the embodiment, when the scrolling operation is detected in the detection step, content to emphasize or describe the web page is displayed as the advertisement content.

Also, in the variation step in the distribution apparatus 30 according to the embodiment, when the scrolling operation is detected in the detection step, the display mode of the advertisement content is varied and different content related to the advertisement content is further displayed.

Also, in the variation step in the distribution apparatus 30 according to the embodiment, the display mode of the advertisement content is serially varied each time the scrolling operation is continuously detected within a predetermined period of time in the detection step.

Also, in the distribution apparatus 30 according to the embodiment, the distribution unit distributes the web page including a plurality of display areas to display the advertisement content. Also, in the variation step, each time a display area to be a display object is varied in response to the scrolling operation, the display mode of the advertisement content displayed on the display area is varied.

Also, in the variation step in the distribution apparatus 30 according to the embodiment, the display mode of the advertisement content is varied while the scrolling operation is detected in the detection step.

Also, in the detection step in the distribution apparatus 30 according to the embodiment, it is detected whether the web page is selected and is in a selected state after the scrolling operation. Also, in the variation step, the display mode of the advertisement content is varied while the selected state is detected in the detection step.

Also, in the detection step in the distribution apparatus 30 according to the embodiment, it is detected whether the web page is moving. Also, in the variation step, the display mode of the advertisement content is varied while it is detected, in the detection step, that the web page is moving.

Also, in the detection step in the distribution apparatus 30 according to the embodiment, a speed of the operation to move the web page or a speed of the web page which moves in response to the scrolling operation is detected. Also, in the variation step, when the speed detected in the detection step is equal to or higher than a predetermined threshold speed, the display mode of the advertisement content is varied.

Also, in the variation step in the distribution apparatus 30 according to the embodiment, the advertisement content is displayed on a fixed position without being linked to variation of a display position in the web page.

Thus, the distribution apparatus 30 according to the embodiment can improve advertisement effect of the advertisement content.

Also the distribution apparatus 30 according to the embodiment further includes a calculation unit configured to calculate a charging amount, which is charged to a submission source which submits the advertisement content, according to the number of times the scrolling operation is detected in the detection step or a moving time of the web page detected in the detection step.

Thus, the distribution apparatus 30 according to the embodiment can calculate a fair charging amount which is directly linked to advertisement effect.

In the above, a several embodiments of the present application have been described in detail based on the drawings. However, these embodiments are examples. As well as the modes described in the disclosure of the invention, it is possible to embody the present invention in a different form in which various modifications and improvements are made based on knowledge of those skilled in the art.

Also, a "unit (section, module, and unit)" described above may be interpreted as "means", a "circuit," or the like. For example, a distribution unit can be interpreted as distribution means or a distribution circuit.

According to a mode of an embodiment, visibility of content can be prevented from being lowered.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A touch panel display control apparatus communicating over a network with a terminal apparatus including a touch panel display, the touch panel display control apparatus comprising:
   a memory storing a first content and control information; and
   a processor operatively coupled to the memory, the processor being programmed to distribute the control information and the first content to the terminal apparatus, the control information, when received by the terminal apparatus, causing a processor of the terminal apparatus to execute:
      displaying second content superimposed onto the first content in a display region of the touch panel display of the terminal apparatus in a first display mode, the second content having a first transparency such that the first content is visible through the second content and the visibility of the first content is prevented from being lowered in the display region in the first display mode;
      detecting a swipe gesture on the touch panel display, the swipe gesture causing the first content to move relative to the display region of the touch panel display of the terminal apparatus;
      in response to the detected swipe gesture on the touch panel display and the first content moving relative to the display region, changing the first display mode to a second display mode by changing a transparency of the second content from the first transparency to a second transparency that is lower than the first transparency such that the second content becomes more visible in the display region during the movement of the first content and obstructs with the visibility of the first content; and
      in response to the first content stopping moving relative to the display region, changing the second display mode to the first display mode by reverting the second content from the second transparency to the first transparency such that the second content does not interfere with the visibility of the first content.

2. The touch panel display control apparatus according to claim 1, wherein the control information causes the terminal apparatus to execute:
   displaying the second content in a translucent state in such a manner that the second content has higher transparency than the first content; and
   displaying, when the first content is moving relative to the display region, the second content in a state in which the second content has lower transparency than the transparency of the second content in the translucent state.

3. The touch panel display control apparatus according to claim 1, wherein the control information causes the terminal apparatus to execute:
   displaying the second content in a transparent state; and
   displaying, when the first content is moving relative to the display region, the second content in a state in which the second content has higher transparency than the first content.

4. The touch panel display control apparatus according to claim 1, wherein the control information causes the terminal apparatus to execute dynamically changing the first display mode to the second display mode when the swipe gesture is detected.

5. The touch panel display control apparatus according to claim 4, wherein the control information causes the terminal apparatus to execute dynamically changing, when the swipe gesture is detected again after the first display mode is dynamically varied to a predetermined state, the first display mode from the predetermined state.

6. The touch panel display control apparatus according to claim 1, wherein the control information causes the terminal apparatus to execute:
   detecting whether a predetermined area of the first content is displayed in response to the swipe gesture; and
   in response to detecting that the predetermined area of the first content is displayed, switching from the second content to a third content or newly displaying the third content.

7. The touch panel display control apparatus according to claim 6, wherein the control information causes the terminal apparatus to execute displaying, as the third content, content related to the first content or the second content.

8. The touch panel display control apparatus according to claim 1, wherein the control information causes the terminal apparatus to execute displaying, in response to detecting the swipe gesture, content to emphasize or describe the first content as the second content.

9. The touch panel display control apparatus according to claim 1, wherein the control information causes the terminal apparatus to execute changing the second display mode to display a fourth content related to the second content, in response to detecting the swipe gesture.

10. The touch panel display control apparatus according to claim 1, wherein the control information causes the terminal apparatus to execute serially changing the second display mode each time the swipe gesture is continuously detected within a predetermined period of time.

11. The touch panel display control apparatus according to claim 1, wherein:
   the processor is programmed to distribute the first content including a plurality of display areas to display the second content; and
   the control information causes the terminal apparatus to execute:
      displaying the second content in one of the plurality of display areas in the first display mode;
      detecting whether at least one display area other than the one of the plurality of display areas is displayed in response to the swipe gesture; and
      in response to detecting that the at least one display area is displayed, displaying the second content in the at least one display area in the second display mode.

12. The touch panel display control apparatus according to claim 1, wherein the control information causes the terminal apparatus to execute changing the first display mode to the second display mode during the swipe gesture being detected.

13. The touch panel display control apparatus according to claim 1, wherein the control information causes the terminal apparatus to execute:
   detecting whether the first content is in a selected state indicating that the first content is selected after the swipe gesture; and
   changing the first display mode to the second display mode in response to the selected state being detected.

14. The touch panel display control apparatus according to claim 1, wherein the control information causes the terminal apparatus to execute:
   detecting whether the first content is moving; and
   changing the first display mode to the second display mode during detecting that the first content is moving.

15. The touch panel display control apparatus according to claim 1, wherein the control information causes the terminal apparatus to execute:
   detecting a speed of the swipe gesture moving the first content or a speed of the first content moving in response to the swipe gesture; and
   in response to the detected speed being equal to or higher than a predetermined threshold speed, changing the first display mode to the second display mode.

16. The touch panel display control apparatus according to claim 1, wherein the control information causes the terminal apparatus to execute displaying the second content at a fixed position relative the display region of the touch panel display of the terminal apparatus.

17. The touch panel display control apparatus according to claim 1, wherein the processor is programmed to calculate a charging amount that is charged to a submission source submitting the second content, the charging amount being calculated according to a number of times the swipe gesture is detected or an amount of time the first content moves in response to the swipe gesture.

18. A terminal apparatus communicating over a network with a touch panel display control apparatus, the terminal apparatus comprising:
   a touch panel display; and
   a processor programmed to receive control information and a first content from the touch panel display control apparatus, the control information causing the terminal apparatus to execute:
      displaying second content superimposed onto the first content in a display region of the touch panel display of the terminal apparatus in a first display mode, the second content having a first transparency such that the first content is visible through the second content and the visibility of the first content is prevented from being lowered in the display region in the first display mode;
      detecting a swipe gesture on the touch panel display, the swipe gesture causing the first content to move relative to the display region;
      in response to the detected swipe gesture on the touch panel display and the first content moving relative to the display region, changing the first display mode to a second display mode by changing a transparency of the second content from the first transparency to a second transparency that is lower than the first transparency such that the second content becomes more visible in the display region during the movement of the first content and obstructs with the visibility of the first content; and
      in response to the first content stopping moving relative to the display region, changing the second display mode to the first display mode by reverting the second content from the second transparency to the first transparency such that the second content does not interfere with the visibility of the first content.

19. A touch panel display control method executed by a computer, the method comprising:
   distributing, by the computer, control information and a first content to a terminal apparatus including a touch panel display, the control information causing a processor of the terminal apparatus to execute:
      displaying second content superimposed onto the first content in a display region of the touch panel display of the terminal apparatus in a first display mode, the second content having a first transparency such that the first content is visible through the second content and the visibility of the first content is prevented from being lowered in the display region in the first display mode;
      detecting a swipe gesture on the touch panel display, the swipe gesture causing the first content to move relative to the display region of the touch panel display of the terminal apparatus;
      in response to the detected swipe gesture on the touch panel display and the first content moving relative to the display region, changing the first display mode to a second display mode by changing a transparency of the second content from the first transparency to a second transparency that is lower than the first transparency such that the second content becomes more visible in the display region during the movement of the first content and obstructs with the visibility of the first content; and
      in response to the first content stopping moving relative to the display region, changing the second display mode to the first display mode by reverting the second content from the second transparency to the first transparency such that the second content does not interfere with the visibility of the first content.

20. A non-transitory computer-readable storage medium storing a touch panel display control program causing a computer to execute distributing control information and a first content to a terminal apparatus including a touch panel display, the control information causing a processor of the terminal apparatus to execute:
   displaying second content superimposed onto the first content in a display region of the touch panel display of the terminal apparatus in a first display mode, the second content having a first transparency such that the first content is visible through the second content and the visibility of the first content is prevented from being lowered in the display region in the first display mode;
   detecting a swipe gesture on the touch panel display, the swipe gesture causing the first content to move relative to the display region of the touch panel display of the terminal apparatus;
   in response to the detected swipe gesture on the touch panel display and the first content moving relative to the display region, changing the first display mode to a second display mode by changing a transparency of the second content from the first transparency to a second transparency that is lower than the first transparency such that the second content becomes more visible in the display region during the movement of the first content and obstructs with the visibility of the first content; and in response to the first content stopping moving relative to the display region, changing the second display mode to the first display mode by reverting the second content from the second transparency to the first transparency such that the second content does not interfere with the visibility of the first content.

* * * * *